US009037967B1

(12) United States Patent
Al-Jefri et al.

(10) Patent No.: US 9,037,967 B1
(45) Date of Patent: May 19, 2015

(54) ARABIC SPELL CHECKING TECHNIQUE

(71) Applicant: King Fahd University of Petroleum and Minerals, Dhahran (SA)

(72) Inventors: Majed Mohammed Al-Jefri, Dhahran (SA); Sabri Abdullah Mohammed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/182,946

(22) Filed: Feb. 18, 2014

(51) Int. Cl.
*G06F 17/00* (2006.01)
*G06F 17/27* (2006.01)

(52) U.S. Cl.
CPC ................... *G06F 17/273* (2013.01)

(58) Field of Classification Search
CPC .................................................. G06F 17/273
USPC ........................................................ 715/257
See application file for complete search history.

(56) References Cited

U.S. PATENT DOCUMENTS

| | | | | |
|---|---|---|---|---|
| 6,424,983 | B1* | 7/2002 | Schabes et al. | 715/257 |
| 6,618,697 | B1* | 9/2003 | Kantrowitz et al. | 703/22 |
| 7,516,404 | B1* | 4/2009 | Colby | 715/257 |
| 7,856,598 | B2* | 12/2010 | Liao et al. | 715/257 |
| 8,126,832 | B2* | 2/2012 | Spring | 706/46 |
| 8,341,520 | B2* | 12/2012 | Iakobashvili et al. | 715/257 |
| 8,374,847 | B2* | 2/2013 | Ku et al. | 704/9 |
| 8,473,280 | B2* | 6/2013 | Al-Omari et al. | 704/9 |
| 8,548,995 | B1* | 10/2013 | Curtiss | 707/731 |
| 8,572,126 | B2* | 10/2013 | Flor | 707/797 |
| 8,706,474 | B2* | 4/2014 | Blume et al. | 704/7 |
| 2002/0032564 | A1* | 3/2002 | Ehsani et al. | 704/235 |
| 2004/0111475 | A1 | 6/2004 | Schultz | |
| 2005/0044495 | A1* | 2/2005 | Lee et al. | 715/533 |
| 2006/0080082 | A1 | 4/2006 | Ravindra et al. | |
| 2006/0155751 | A1* | 7/2006 | Geshwind et al. | 707/102 |
| 2006/0241353 | A1* | 10/2006 | Makino et al. | 600/300 |
| 2006/0282266 | A1* | 12/2006 | Lopez-Barquilla et al. | 704/257 |
| 2009/0092323 | A1* | 4/2009 | Qiu et al. | 382/229 |
| 2009/0164891 | A1 | 6/2009 | Chang | |
| 2009/0228777 | A1* | 9/2009 | Henry et al. | 715/230 |
| 2010/0082333 | A1* | 4/2010 | Al-Shammari | 704/10 |
| 2010/0138210 | A1* | 6/2010 | Seo et al. | 704/2 |
| 2010/0286979 | A1* | 11/2010 | Zangvil et al. | 704/9 |

(Continued)

OTHER PUBLICATIONS

Mustafa et al., Usinf N-Grams for Arabic Text Searching, Google 2004, pp. 1002-1007.*

(Continued)

*Primary Examiner* — Cong-Lac Huynh
(74) *Attorney, Agent, or Firm* — Oblon, McClelland, Maier & Neustadt, L.L.P.

(57) ABSTRACT

An Arabic spelling error detection and correction method for identifying real word spelling errors. The method uses a corpus of Arabic text alongside n-gram statistical techniques to detect erroneous words within the text. After identifying the erroneous word the method uses a dictionary formed from the corpus of Arabic text to retrieve candidate correction word to replace the erroneous word with. Using n-gram statistical models candidate correction words are generated and ranked in order of highest probable correction for the word. The generated and ranked correction words are assessed and the best correction word is selected. A final assessment of the correction is conducted and if the result is positive then erroneous word is replaced with the highest statistical correction.

18 Claims, 11 Drawing Sheets

Proposed method for real-word error detection and correction

(56) References Cited

U.S. PATENT DOCUMENTS

| | | | |
|---|---|---|---|
| 2010/0318538 A1* | 12/2010 | Wyman et al. | 707/759 |
| 2010/0332217 A1* | 12/2010 | Wintner et al. | 704/9 |
| 2011/0202512 A1* | 8/2011 | Pantanelli et al. | 707/706 |
| 2012/0260339 A1* | 10/2012 | Bhogal et al. | 726/23 |
| 2013/0145261 A1* | 6/2013 | Fux et al. | 715/257 |
| 2013/0231922 A1* | 9/2013 | Park et al. | 704/9 |
| 2013/0283156 A1* | 10/2013 | Al Badrashiny et al. | 715/257 |
| 2014/0032532 A1* | 1/2014 | Song et al. | 707/722 |
| 2014/0104175 A1* | 4/2014 | Ouyang et al. | 345/168 |
| 2014/0136197 A1* | 5/2014 | Mamou et al. | 704/235 |
| 2014/0222416 A1* | 8/2014 | Huang | 704/9 |

OTHER PUBLICATIONS

Zitouni et al., Corpus-Based Arabic Stemming Usinf N-Grams, Springer 2010, pp. 280-289.*

Shaalan, Rule-based Approach in Arabic Natural Language Processing, Google 2010, pp. 1-9.*

Riadh Bouslim, et al., "Fault detection system for Arabic language", Les Ressources Langagieres : Construction et Exploration, (12 pages).

Khaled Shaalan, et al., "Towards Automatic Spell Checking for Arabic", (8 pages).

* cited by examiner

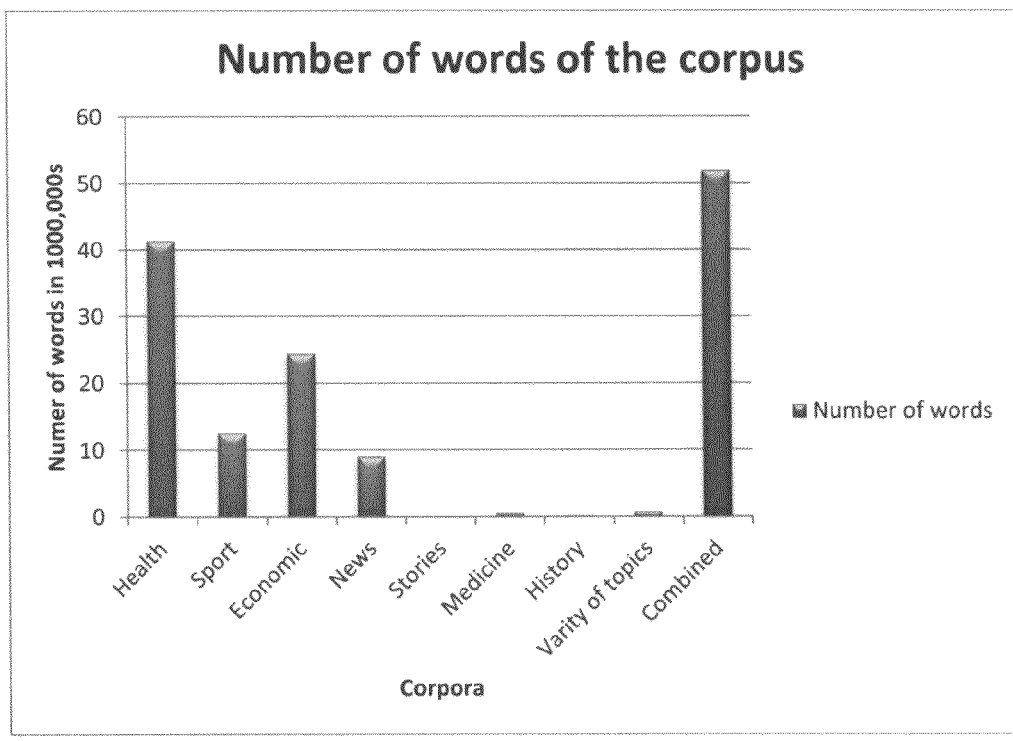
FIG. 1. Number of words in each corpus

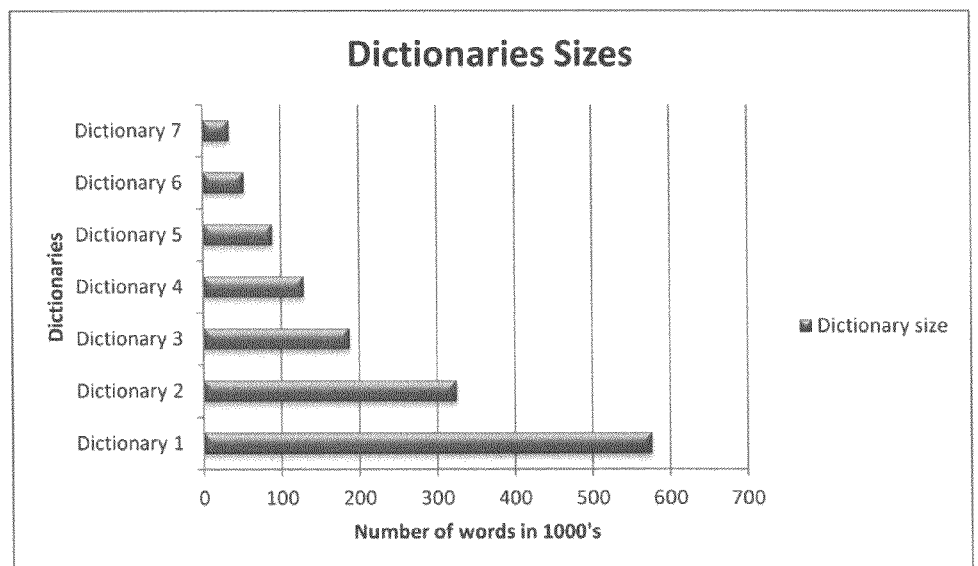
FIG. 2. Sizes of the dictionaries constructed

Input: Normal text

Output: Detected real-word errors

Begin

For each sentence
1. For each tri-gram in the sentence
        If tri-gram $\{w_{i-2}, w_{i-1}, w_i\}$ is not found, then
            If both bi-grams $\{w_{i-1}, w_i\}, \{w_i, w_{i-1}\}$ are not found, then
                $w_i$ is considered suspicious.
            End if
        End if
2. For each suspicious word $W_s$
        Find all of its spelling variations
        For each variations $W_v$
           1. Replace $W_s$ with $W_v$
           2. Calculate the new sentence probability
           3. If the formed sentence probability is greater than the original, then
                The original word is raised as an error End FIG. 3 Error Detection Algorithm Input: Text with detected errors Output: Corrected text Begin For each detected error $W_e$ 1.  Find all spelling variations of $W_e$ 2.  For each spelling variation $W_v$ i.  Replace $W_e$ with $W_v$ ii.  Calculate the new sentence probability 3.  Save the sentence with maximum probability with its variation 4.  If the maximum sentence probability is greater than the probability of the sentence with the original word, then The variation with the maximum probability is considered the correction for the erroneous word End FIG. 4 Error Correction Algorithm

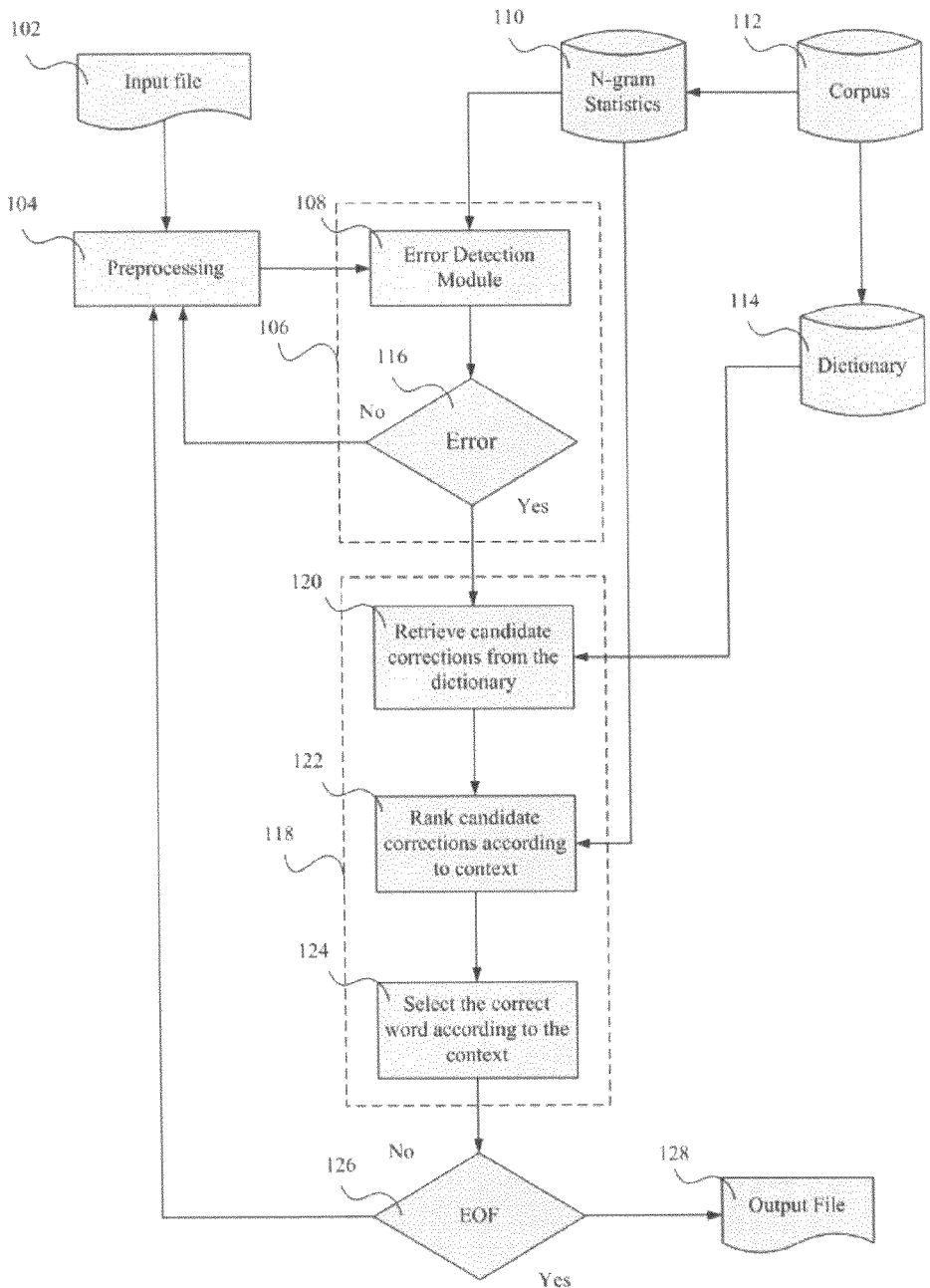
FIG. 5 Proposed method for real-word error detection and correction

- يمكن مقارنته مع الارقام المعلنة للتاكد من مدى دقتها ومدى تحسن مستوى شفافية المعلومات ← وقتها
- المخصص لها مليار ريال لبناء وحدة سكنية ← ركنية
- كان قادرا على العودة للمباراة بعد التعادل ← التعامل
- كتسجيل مستوى غير طبيعي للسكر في الدم قد يؤدي الى امراض في القلب وجلطات ← القطب
- وان الارقام الصادرة عن الاتحاد العالمي للسكري تشير الى ان المرض تسبب بحوالي ← العرض

FIG. 6 Examples of inducing errors

Input: Normal text

Output: Text with errors

Begin

1. Select a word randomly from the input text;

2. Find all variations of the selected word from the dictionary;

3. Select one variation randomly from the fetched variations;

4. Replace the original word with the selected variation.

5. Repeat 1 to 4 until the number of errors to be induced is reached.

End

FIG. 7 Error Generating Algorithm

| | |
|---|---|
| SUCCESSFUL CORRECTION | • مع ابقاء سقف الانتاج المعقول به والبالغ ← المعمول [المعمول]<br>• خصوصا لدول اوبك التي تستطيع ان تتعايش مع هذا المعدة لتغطي اجمالي متطلباتها المالية ← المعدل [المعدل]<br>• تدل دلالة واضحة على مدى الحرص والاهتمام الذي توليه الحكومة الرشيدة في توفر العيش الرغيد للمواطنين ← توفير [ توفير] |
| FALSE POSITIVE | • وتتعامل مع المتطلبات النفطية على صعيد العرض والطلب بالارقام والاحصاءات ← النفسية [النفطية ]<br>• لكن لم يكن هناك اي اثر لخلايا سرطانات الكلى الخالصة ← الخاصة [ الخالصة]<br>• النتائج التي توصلنا اليها تدعم التوصيات الغذائية للوقاية من السرطان ← وتدعم [ تدعم]<br>• هذا التوجه قائم لدى المسؤولين في القناة الذين يرغبون طبعا في تطوير برامجهم ← القضاة [القناة] |
| FALSE NEGATIVE | • وخلص باحثون نشروا دراستهم في الدورية الامريكية للتغذية السريرية الى ان البالغين في منتصف العشر الاكثر تناولا للحوم الحمراء يكونون اكثر عرضة للاصابة [العسر]<br>• باستخدام افران المايكروويف لطفي اللحوم جزئيا قبل تعريضها لدرجات حرارة عالية [لطهي]<br>• والمنطق الفقري السليم يرفض ذلك بل ومنطقة المفهوم الشامل للعلاج [الفطري] |
| TRUE POSITIVE DETECTION, FALSE POSITIVE CORRECTION | • وربطت الدراسة وجود محتوى اكبر من المواد الكيميائية في اللحوم المعوية بزيادة خطر الاصابة بالمرض ← المعنية [المشوية]<br>• تتسم ميزانية الدولة دائما بمميزات عدة يتمثل اهمها في الشمولية وتركيز الصرف الكير على جوانب عدة حساسة تمس حياة المواطنين اليومية ومتطلباتهم ← اكبر [الاكبر]<br>• وكانت شركات غربية منها توتال الفرنسية وشل الهولندية وسنكور الكندية المختصر بانتاج الغاز ← المختص[ المختصة] |

FIG. 8 Examples of different corrections

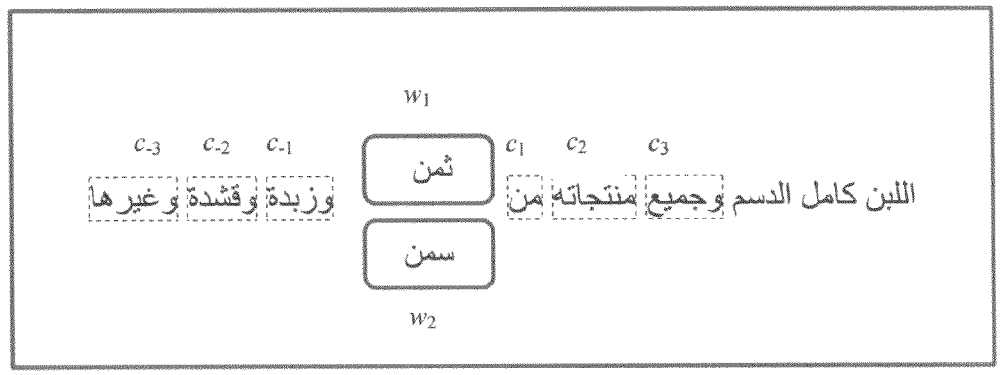
FIG. 9 An example of context words

Training phase

For each word in the confusion set:

(1) Extract all words in a $\pm k$ window.

(2) Count the number of occurrences for each context word.

(3) Store context words along with their statistics.

Testing Phase

For any encountered word in the confusion set, (1) Extract the words $c_j$ in a $\pm k$ window.

(2) If the word $c_j$ is encountered during the training phase, then a) Calculate its probability.

b) Calculate the cumulative probability summing up log probabilities of all encountered context words.

(3) Repeat (1) and (2) for all confusion set members (4) The word of the sentence with the highest probability is considered as the best fit in that context.

FIG. 10 Training and testing phases

ARABIC SPELL CHECKING TECHNIQUE

BACKGROUND

1. Field of the Invention

This disclosure relates to a method and computer-implemented system for detecting and correcting real-word errors in Arabic text.

2. Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly nor impliedly admitted as prior art against the present invention.

Research on spell checking of Arabic language increased dramatically in recent years due to the increased demand for Arabic applications that require spell checking and correction facilities. Relatively little Arabic spell checking research has been disclosed on non-word error detection and correction and less on real-word error detection and correction.

(Haddad, B., and M. Yaseen, 2007, "Detection and Correction of Non-Words in Arabic: A Hybrid Approach." International Journal of Computer Processing of Oriental Languages (IJCPOL) 20(4): 237-257, incorporated herein by reference) presented a hybrid model for non-word Arabic detection and correction. Their work was based on semi-isolated word recognition and correction techniques considering the morphological characteristics of Arabic in the context of morpho-syntactical, morphographemic and phonetic bi-gram binary rules. A hybrid approach utilized morphological knowledge in the form of consistent root-pattern relationships and some morpho-syntactical knowledge based on affixation and mor-phographemic rules to recognize the words and correct non-words.

(Hassan, A, H Hassan, and S Noeman. 2008. "Language Independent Text Correction using Finite State Automata." Proceedings of the 2008 International Joint Conference on Natural Language Processing (IJCNLP), incorporated herein by reference); proposed an approach for correcting spelling mistakes automatically. Their approach used finite state techniques to detect misspelled words. The dictionary was assumed to be represented as deterministic finite state automata. They build a finite state machine (FSM) that contains a path for each word in the input string. Then the difference between generated FSM and dictionary FSM is calculated. This resulted in an FSM with a path for each misspelled word. They created Levenshtein-transducer to generate a set of candidate corrections with edit distances of 1 and 2 from the misspelled word. Confusion matrix was also used to reduce the number of candidate corrections. They selected the best correction by assigning a score to each candidate correction using a language model. Their prototype was tested on a test set composed of 556 misspelled words of edit distances of 1 and 2 in both Arabic and English text and they reported an accuracy of 89%. However, using the finite-state transducers composition to detect and correct misspelled word is time consuming.

(Ben Othmane Zribi, C., Hanene Mejri, and M. Ben Ahmed. 2010. "Combining Methods for Detecting and Correcting Semantic Hidden Errors in Arabic Texts." Computational Linguistics and Intelligent Text Processing: 634-645, incorporated herein by reference). proposed a method for detecting and correcting semantic hidden errors in Arabic text based on their previous work of Multi-Agent-System (MAS)

(Ben Othmane Z C Ben Fraj F, Ben Ahmed M. 2005. "A Multi-Agent System for Detecting and Correcting 'Hidden' Spelling Errors in Arabic Texts." In Proceedings of the 2nd International Workshop on Natural Language Understanding and Cognitive Science NLUCS, ed. Bernadette Sharp. INSTICC Press, p. 149-154, incorporated herein by reference). Their technique is based on checking the semantic validity of each word in a text. They combined four statistical and linguistic methods to represent the distance of each word to its surrounding context. These methods are co-occurrence-collocation, context-vector method, vocabulary-vector method and Latent Semantic Analysis method. They compared this representation with the ones obtained from a textual corpus made of 30 economic texts (29,332 words). They assumed that there is only one error in each sentence and based on that they used a voting method to select one from the suspected errors found by each method. Once an error was detected all candidate suggestions of one minimum edit distance were generated in order to correct the error. A list of all candidates was maintained and substituted with the erroneous word forming a set of candidate sentences. Sentences with semantic anomalies were eliminated from the list using the detection module of the system. The remaining sentences were then sorted using combined criteria of classification namely, typographical distance, proximity value and position of error. The system was tested on a test set of 1,564 words and 50 hidden errors in 100 sentences and a result of 97.05% accuracy was reported. The limitation of their work is assuming that a sentence can have a maximum of one error. In addition, the corpus used in training phase is small and the number of errors in testing is limited.

(Shaalan, K, R Aref, and A Fahmy. 2010. "An Approach for Analyzing and Correcting Spelling Errors for Non-native Arabic learners." In the Proceedings of the 7th International Conference on Informatics and Systems, INFOS2010, Cairo, p. 53-59, incorporated herein by reference) proposed an approach for detecting and correcting non-word spelling errors made by non-native Arabic learners. They utilized Buckwalter's Arabic morphological analyzer to detect the spelling errors. To correct the misspelled word, they used the edit distance techniques in conjunction with rule-based transformation approach. They applied edit distance algorithm to generate all possible corrections and transformation rules to convert the misspelled word into a possible word correction. Their rules were based on common spelling mistakes made by Arabic learners. After that, they applied a multiple filtering mechanism to reduce the proposed correction word lists. They evaluated their approach using a test data that is composed of 190 misspelled words. The test set was designed to cover only common errors made by non-native Arabic learners, such as Tanween errors, Phonetic errors and Shadda errors. They evaluated their system based on precision and recall measures for both spelling error detection and correction to measure the performance of the system. They achieved 80+% recall and a 90+% precision as reported.

(Alkanhal, Mohamed I., Mohamed A. Al-Badrashiny, Mansour M. Alghamdi, and Abdulaziz O. Al-Qabbany. 2012. "Automatic Stochastic Arabic Spelling Correction with Emphasis on Space Insertions and Deletions." IEEE Transactions on Audio, Speech, and Language Processing 20(7): 2111-2122, incorporated herein by reference) presented a stochastic-based technique for correcting misspelled words in Arabic texts, targeting non word-errors. They also considered the problem of space insertion and deletion in Arabic text. Their system consists of two components, one for generating candidates and the other for correcting the spelling error. In the first component, the Damerau-Levenshtein edit distance was used to rank possible candidates for misspelled words. This component also addresses merged and split word errors by utilizing the A* lattice search and 15-gram language model at letter level to split merged words. For the split words the component finds all possible merging choices to produce the correct word. In the second component they used the A* lattice search and 3-gram language model at the word level to find the most probable candidate. They reported that their system achieved 97.9% $F_1$ score for detection and 92.3% $F_1$ score for correction.

(Ben Othmane Zribi, C., and M. Ben Ahmed. 2012. "Detection of semantic errors in Arabic texts." Artificial Intelligence 1: 1-16, incorporated herein by reference) proposed an approach for detecting and correcting real-word errors by combining four contextual methods. They used statistics and linguistic information to check whether the word is semantically valid in a sentence. They implemented their approach on a distributed architecture with reported precision and recall rates of 90% and 83%, respectively. They focused only on errors that cause total semantic inconsistencies; this can be considered as a limitation as they ignored partial semantic inconsistencies and semantic incompleteness errors. In addition they assumed that a sentence can have one error at most. Moreover, the used corpus is relatively small (1,134,632 words long) containing only economics articles (i.e. no variations in topics).

To address the deficiencies of conventional spell checking and correction for Arabic text a method and system is disclosed to detect and correct real-word errors automatically using N-grams language models and context words to detect spelling errors. Two techniques of addressing real-word errors are disclosed including unsupervised and supervised learning techniques.

SUMMARY

One aspect of the invention includes an Arabic language spelling error detection and correction method that includes matching typed text with a corpus database of Arabic words and sentences to scan for text and grammatical errors; using a statistic model to detect and produce candidate correction options from a dictionary of text, ranking the candidate correction options in order of highest probability of most correct alternative using N-gram statistical models, selecting the highest probability correction word, and correcting the text.

In another aspect the Arabic language spelling error detection and correction method includes extracting words from the corpus of Arabic text, counting the words and arranging the words in order of the number of times they occur.

In another aspect the Arabic language spelling error detection and correction method forms a series of dictionaries arranges words in descending order based on the number of occurrences.

In another aspect the Arabic language spelling error detection and correction method generates n-gram language models comprising of uni-grams, bi-grams and tri-grams.

In another aspect of the Arabic language spelling error detection and correction method supervised learning methods incorporating confusion sets are formed and used to detect real-word Arabic spelling errors.

In another aspect of the Arabic language spelling error detection and correction method a data-base of commonly misspelled words are stored and arranged into groups according to the similarity of the sounds of their letters and closeness of meaning.

In another aspect of the Arabic language spelling error detection and correction method a database of closely spelled words with similar sounding letters that have alternative meanings are matched for the n-gram model to use to detect spelling errors.

Another aspect of the disclosure includes a real word error detection and correction method using n-gram language models that includes capturing properties of Arabic text using a tri-gram model to calculate the probability of the next word of a sentence, using the tri-gram model to detect and correct Arabic words within a given context, generating candidate variation words when an erroneous word is detected, forming sentences by replacing erroneous words by all the variations words and calculating the probability of their correctness, comparing the highest probability correction with the probability of the original erroneous word to assess if it is above the set variation threshold, correcting the erroneous word when the maximum sentence probability is greater than the sentence with the original word, The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 shows the number of words in each category in the corpus.

FIG. 2 is a graph illustration of the sizes of the dictionaries constructed.

FIG. 3 demonstrates a proposed Error Detection Algorithm.

FIG. 4 demonstrates a proposed Error Correction Algorithm.

FIG. 5 is a flow diagram illustrating the steps in the proposed method for real-word error detection and correction.

FIG. 6 shows examples of inducing errors in Arabic text.

FIG. 7 shows a proposed error generating algorithm.

FIG. 8 shows examples of different text corrections.

FIG. 9 shows an example of context words.

FIG. 10 details the training and testing phases.

DETAILED DESCRIPTION OF THE EMBODIMENTS

Figure 11:
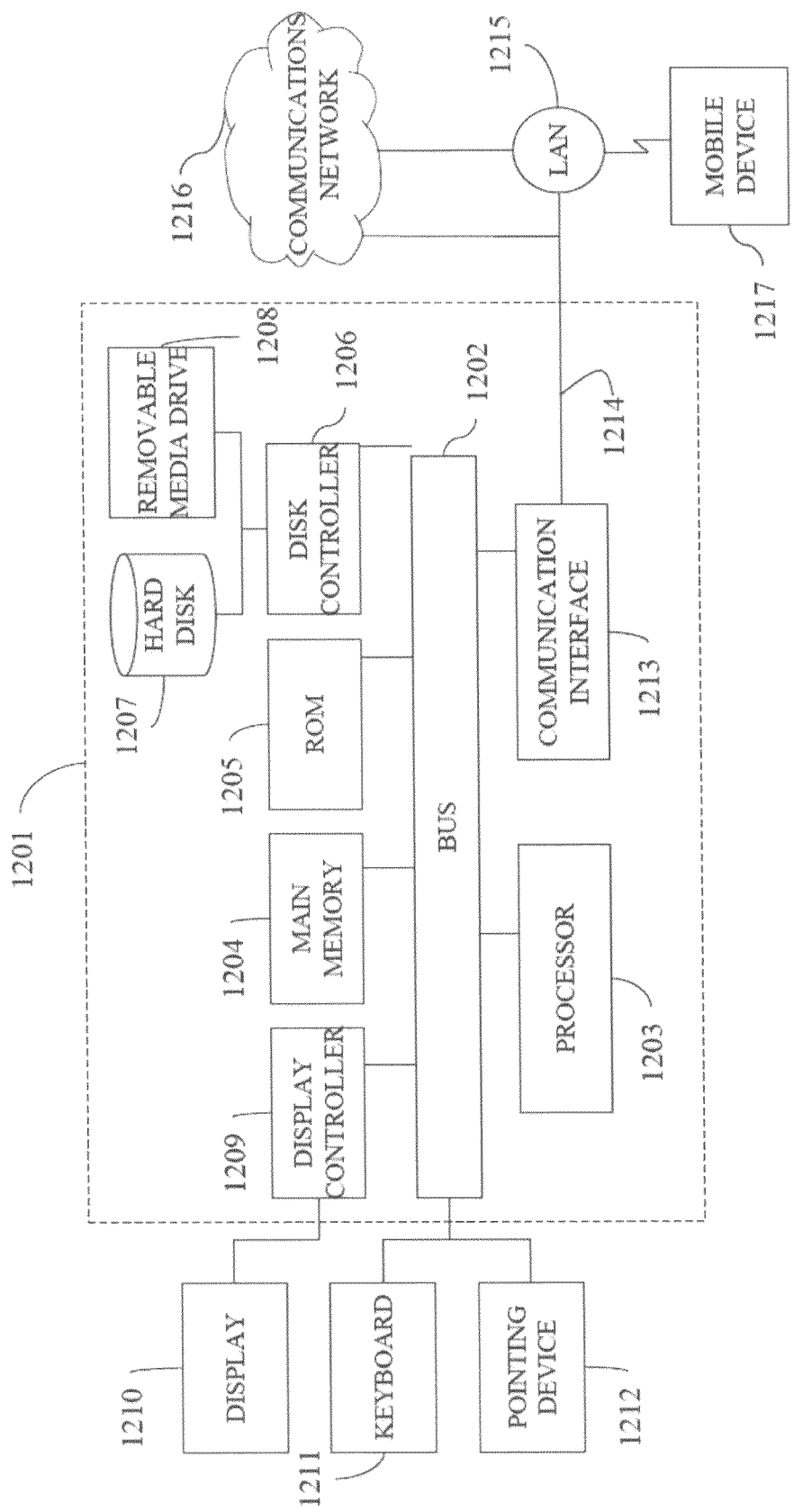
FIG. 11 is a block diagram of a computer system according to an exemplary embodiment.

Spell checking is the process of finding misspelled words and possibly correcting them. Spell checkers are important tools for document preparation, word processing, searching, and document retrieval. The task of detecting and correcting misspelled words in a text is challenging. Most of the modern commercial spell checkers work on word level with the possibility of detecting and correcting non-word errors. However, few of them use techniques to work on real-word errors. This is one of the challenging problems in text processing. Moreover, most of the proposed techniques so far are on Latin script languages. However, Arabic language has not received much interest, especially for real-word errors.

The present disclosure addresses the problem of real-word errors using context words and n-gram language models. An unsupervised model for real-word error detection and correction for Arabic text in which N-gram language models was implemented. Supervised models were also implemented that use confusion sets to detect and correct real-word errors. In the supervised models, a window based technique was used to estimate the probabilities of the context words of the confusion sets. N-gram language models were also used to detect real-word errors by examining the sequences of n words. The same language models are also used to choose the best correction for the detected errors. The experimental results of the prototypes showed promising correction accuracy.

Conventional spell checking systems detect typing errors by simply comparing each token (word) in a text against a dictionary that contains correctly spelled words. The tokens that match elements of the dictionary are considered as correctly spelled words; other tokens are flagged as errors and corrections are suggested. A correctly spelled token that is not the one that the user intended cannot be detected by such systems. These errors are known as real-word errors or semantic errors. Real-word errors result in morphologically valid words whose use in the context is senseless. These errors may even be caused by the spelling checkers themselves, when correcting non-word spelling errors automatically, as in some word-processors, they change a non-word to the wrong real word (Hirst, Graeme, and Alexander Budanitsky. 2005. "Correcting real-word spelling errors by restoring lexical cohesion." Natural Language Engineering 11 (1): 87-111, incorporated herein by reference).

Moreover, sometimes the user mistakenly selects a wrong word from the suggested list offered by the word processor. Real-word errors are not a minority, it has been reported that 25%, 30% and 40% of total errors were real-word errors in (Young, Charlene W, Caroline M Eastman, and Robert L Oakman. 1991. "An analysis of ill-formed input in natural language queries to document retrieval systems." Information Processing & Management 27(6): 615-622, incorporated herein by reference), (Wing, A M, and A D Baddeley. 1980. "Spelling Errors in Handwriting: A Corpus and Distributional Analysis." In Cognitive Processes in Spelling, ed. Uta Frith. Academic Press, p. 251-283, incorporated herein by reference) and (Mitton, R. 1987. "Spelling checkers, spelling correctors and the misspellings of poor spellers." Information Processing 23(5): 495-505), incorporated herein by reference) respectively.

The following sentences contain real-word errors that are not detected by conventional spell checkers. The words in the brackets are the correct words intended by the user.

من يعتقد [ يَنْتَقِد ] ثورة يناير بكل تداعياتها ونتائجها
1— كما سنجد فى المقابل
ساعدت على الاقبال الكثير [ الكبير ] من الدول والافراد
2— التسهيلات المتوفرة
جادة من التقييم لدراسة جواب [ جوانب ] النجاح العديدة
3— تخضع لمرحلة
الحزن التي لفت نجوم الحريق [ الفريق ] لحظة تتويجهم
4— ما خلفته الخسارة من الم تجسد في مواقف
بشان تاخر ارامكو فى إزداد [ إمداد ] الوقود لخطوط الانتاج الجديدة
5— لكن التقرير ابدى قلقا
هذا الاعلان لان لها استثمارات في جهزت [ جهات ] اخرى
6— متذرعا بان الشركة هي من يمنع

The first four sentences contain semantic errors while the remaining two contain syntactical errors. Arabic is very inflected language that contains large number of words compared to other languages. The similarity between Arabic words is also high and this raises the importance of the problem of real-word errors in Arabic.

Spell checkers are important tools for document preparation, word processing, searching and document retrieval. The task of detecting and correcting misspelled words in a written text is challenging, a method of implementing a spell checking and correcting system for Arabic text that is capable of detecting and correcting real-word errors is as follows:

1. Conducting literature survey on spell checking in general and context-sensitive spell checking techniques in particular.
2. Data Collection and Preparation.
   a. Building a suitable Arabic text corpus for this work.
   b. Analyzing the corpus and building a suitable language models for spell checking and correction (N-grams, dictionaries).
   c. Collecting Arabic confusion sets to be used in the supervised learning techniques.
   d. Preparing data in which real-word errors are induced to be used in testing the prototype.
3. Implementation and Evaluation
   a. Implementing Arabic spell checking prototypes that detect and correct real-word errors.
   b. Evaluating the performance of the proposed prototypes.
   c. Identifying factors that can improve the performance of the implemented prototypes.
4. Analyzing the results of the experimental work and presenting conclusions.

Spell checkers identify misspelled words in a document and try to correct them. Detection is the process of parsing the text and finding misspelled words. Correction is the process of correcting errors found in the detection phase. Errors could be either non-word errors (i.e. words that are not in the dictionary) or real-word errors (i.e. words that are in the dictionary but is not what the user intended).

Research for detecting and correcting spelling errors has been around from the 1960s (Damerau, Fred J. 1964. "A technique for computer detection and correction of spelling errors." Communications of the ACM 7(3): 171-176, incorporated herein by reference), since then a variety of techniques have been proposed to detect and correct spelling errors. Some of the techniques aim only at detecting errors so that the user is aware of the errors and has the responsibility to correct those errors, while other techniques aim at detecting as well as correcting errors. Automatic spelling error correction systems are classified as: (i) Fully automatic spelling error correction systems and (ii) interactive spelling error correction systems.

In a fully automatic spelling error correction system, the application finds candidate words and chooses the most likely one. The interactive spelling error correction system finds candidate words, ranks them, and suggests the most probable ones. The user then chooses the correct word. In order to correct a detected error, candidate corrections must be found first, the corrections are ranked and the most likely correction is chosen (in the case of a fully automatic system) or the first n most probable corrections are suggested (in the case of an interactive system).

The issue of real-word errors is one of the challenging problems in text processing. Most modern commercial spellcheckers work at the word level when trying to detect and correct errors in a text. Hence, they use simple dictionary lookup techniques. When a word is not in the dictionary, it is considered an error. But what if the misspelled word is a valid word in the dictionary; much more effort is needed to handle such errors. In this work the problem of real-word errors is addressed. Real-word spelling errors are words in a text that occur when a user intends to type a word but mistakenly types a different correctly spelled word, such errors occur due to the spelling or sound similarity between different words. They may be caused by the spell checking systems themselves, when correcting non-word spelling errors automatically, as in some word-processors; they change a non-word to the wrong real word (Hirst, Graeme, and Alexander Budanitsky. 2005. "Correcting real-word spelling errors by restoring lexical cohesion." Natural Language Engineering 11 (1): 87-111, incorporated herein by reference). Moreover, sometimes the user mistakenly selects a wrong word from the suggested list offered by the word processor (Wilcox-O'Hearn, L Amber, G Hirst, and A Budanitsky. 2008. "Real-word spelling correction with trigrams: A reconsideration of the Mays, Damerau, and Mercer, incorporated herein by reference). In the survey conducted by (Kukich, Karen. 1992. "Technique for automatically correcting words in text." ACM Computing Surveys 24(4): 377-439, incorporated herein by reference) real-word errors ranged from 15% to 40% of the total spelling errors.

As most spellcheckers deal with words in isolation, the applications accept these types of errors as correct if they are found in the dictionary. They only flag non-words (i.e. sequence of characters that are not a word in the dictionary) as errors as they match none of the dictionary entries. This process is known as dictionary lookup which is, to some extent, sufficient for non-word spelling errors. However, to detect real-word errors, the spellchecker is required to consider the surrounding context. This approach focuses towards making use of context, techniques that aim at tackling the problem of real-word errors are also referred to as context-sensitive spell checking techniques.

For that, syntactic and semantic knowledge of the language are employed to detect real-word errors. For instance, in the sentence 'مذهب الولد إلى المدرسة', syntactic knowledge could be involved to detect the syntactic error in the sentence. Another example, the sentence 'أكل الرجل الخبر' is semantically incorrect. These types of errors need to be corrected, hence the spellchecker tries to select a closer word as a replacement for the error word as in non-interactive spellcheckers, or the spellchecker suggests a set of candidate words, as in interactive spellcheckers like MS Word, so that the user may choose the intended word by themselves.

The main idea behind the spell checking method that addresses real-word errors is considering the context surrounding the word in error instead of the single word alone. Word N-grams are also used to check misspelling words that result in an unlikely sequence. For example, the word 4-gram 'عرض عليه مال كثير' is more frequent than 'عرض عليه مال كبير', the hypothesis is that the latter 4-gram is more probable to have a misspelled word(s) and the former is the correct one, because its probability is higher. This probability information is useful to detect unlikely word sequences. They are also useful to suggest corrections for erroneous words in sentences by taking the most probable sequences.

Some studies classify errors as typing errors (also called typos) and spelling errors. Typing errors are caused by keyboard slips (e.g. 'عرف' → 'عرفع'). This might happen when a typist misses one key or presses another key mistakenly. Another type of spelling errors results from the writer's ignorance of the correct spelling. Three possible causes for this type of spelling errors are:

Phonetic similarity (e.g. 'ظلام' → 'ضلام').
Semantic similarity (e.g. 'كثير' → 'كبير').
Ignorance of grammatical rules (e.g. 'سبعة أحجار' → 'سبع أحجار')

(Damerau, Fred J. 1964. "A technique for computer detection and correction of spelling errors." Communications of the ACM7(3): 171-176, incorporated here in by reference) defined simple errors as words that differ from the intended word by only a single letter. These errors could be a result of four operations:

Insertion: a misspelled word that is a result of inserting an extra character into the intended word. (e.g. 'شجر' → 'شجار')

Deletion: a misspelled word that is a result of omitting a character from the intended word. (e.g. 'فم' → 'فمم')

Substitution: a misspelled word that is a result of replacing a character in the intended word with another character. (e.g. 'قمر' → 'قبر')

Transposition: a misspelled word that is a result of swapping two adjacent characters in the intended word. (e.g. 'محارب' → 'محراب')

Multi-errors refer to misspelling errors that contain more than one character difference (e.g. 'مختبر' → 'مخبز'). The percentage of single error is high. It was found that 80%, 94%, and 69% are single errors in (Damerau, Fred J. 1964. "A technique for computer detection and correction of spelling errors." Communications of the ACM 7(3): 171-176, incorporated herein by reference), (Zamora, E. 1981. "The use of trigram analysis for spelling error detection." Information Processing & Management 17(6): 305-316, incorporated herein by reference) and (Mitton, R. 1987. "Spelling checkers, spelling correctors and the misspellings of poor spellers." Information Processing 23(5): 495-505, incorporated herein by reference), respectively.

A run-on is the result of omitting a space between two words, (e.g. 'من شرح' → 'منشرح'). A split word occurs when a space is inserted in the middle of a word, (e.g. 'بركان' → 'بر كان'). These kinds of errors cause problems for a spellchecker as they consider spaces as word delimiters. A run-on will be treated as one word while a split word will be treated as two separate words. Consequently, spellcheckers will not flag them as errors if they result in words in the dictionary. (Kukich, Karen. 1992. "Technique for automatically correcting words in text." ACM Computing Surveys 24(4): 377-439, incorporated herein by reference) found that 15% of all errors were word boundary and (Mitton, R. 1987. "Spelling checkers, spelling correctors and the misspellings of poor spellers." Information Processing 23(5): 495-505, incorporated herein by reference) found that 13% of errors were word boundary.

Another classification is non-word versus real-word errors. A non-word error is an error in a word that yields an undefined word (e.g. 'مقرب' → 'مقرّب'). On the other hand, real-word errors are caused by changing a word that results in an existing word in the language (e.g. 'كبير' → 'كثير'). It was found that 25%, 30% and 40% of total errors were real-word errors in (Young, Charlene W, Caroline M Eastman, and Robert L Oakman. 1991. "An analysis of ill-formed input in natural language queries to document retrieval systems." Information Processing & Management 27(6): 615-622, Incorporated herein by reference), (Wing, A M, and A D Baddeley. 1980. "Spelling Errors in Handwriting: A Corpus and Distributional Analysis." In Cognitive Processes in Spelling, ed. Uta Frith. Academic Press, p. 251-283, incorporated herein by reference) and (Mitton, R. 1987. "Spelling checkers, spelling correctors and the misspellings of poor spellers." Information Processing 23(5): 495-505, incorporated herein by reference), respectively.

Real word errors are further sub classified in the literature. (Mitton, R. 1987. "Spelling checkers, spelling correctors and the misspellings of poor spellers." Information Processing 23(5): 495-505, incorporated herein by reference) classifies real-word errors into these subclasses:
1—Wrong-word errors
2—Wrong-form-of-word errors
3—Word-division errors Wrong-word errors occur when the misspelled words are grammatically and semantically differ from the intended words (e.g. 'مقرب' → 'مقر '). Wrong-form-word errors are errors that are grammatically different from the intended words (e.g. 'ذهب الولد الى المدرسة' → 'مذهب الولد الى المدرسة'). Word-division errors are the word boundary errors, run-on and split words, (e.g. 'منقعر' → 'من قعر '). (Mitton, R. 1987. "Spelling checkers, spelling correctors and the misspellings of poor spellers." Information Processing 23(5): 495-505, incorporated herein by reference) found that wrong-word errors represent 44% of total errors, while wrong-form-of-word errors represent 24% of total errors and the remaining 32% were word-division errors of which most errors are incorrect splits.

(Kukich, Karen. 1992. "Technique for automatically correcting words in text." ACM Computing Surveys 24(4): 377-439, incorporated herein by reference) classifies real-word errors by distinguishing between the cause of the error and the result of the error. The following are classes based on the cause of the error:
1. Simple typos (e.g. 'بسر' → 'صبر ').
2. Cognitive or phonetic lapses (e.g. 'مرضات' → 'مرضاة ').
3. Syntactic or grammatical mistakes (e.g. 'تسع نساء' → 'تسعة نساء ').
4. Semantic anomalies (e.g. 'كثير' → 'كبير ').
5. Insertions or deletions of whole words (e.g. 'صرح مدير المدرسة صرح بحاجتها إلى المزيد من الموارد ').
6. Improper spacing (e.g. 'فيهما' → 'في هما ').

Classes Based on Error Results are the Following:
1. Syntactic errors (e.g. 'صوم الشيخ يوما ويفطر يوما ').
2. Semantic errors (e.g. 'ذهب أحمد إلى الشوق ').
3. Structural errors (e.g. 'خمسة المعالج, الذاكرة, و أجهزة الإدخال والاخراج مكونات الحاسب الرئيسية ').
4. Pragmatic errors (e.g. 'النيل ثاني أطول نهر في العالم في عمان يقع نهر ').

(Verberne, Suzan. 2002. "Context-sensitive spell checking based on word trigram probabilities Context-sensitive spell checking based on word trigram probabilities." Master's thesis, University of Nijmegen, February-August, incorporated herein by reference) reclassified the classes based on the cause of error by eliminating the last three classes as they are the results of the previous three ones. This reference criticizes classification based on error result and considers them as two classes, syntactic errors and semantic errors.

Arabic is a very inflected natural language that contains huge number of words compared to other languages. Words in Arabic are graphically similar to each other. As a result, the chance of getting semantic errors in texts increases, since a type/spelling error could result in a valid word (Ben Othmane Zribi, C., and M. Ben Ahmed. 2012. "Detection of semantic errors in Arabic texts." Artificial Intelligence 1: 1-16, incorporated herein by reference).

TABLE 1

Shows an example of the inflectional property of Arabic for the word 'أمر '

| Insertion | Deletion | Substitution | Transposition |
|---|---|---|---|
| فامر | مر | تمر | مرا |
| بامر | ام | جمر | ارم |
| يامر | | سمر | |
| نامر | | اثر | |
| امرت | | اجر | |
| وامر | | ضمر | |
| تامر | | اسر | |
| ... | | ... | |

In table.1 the word is changed into several different real words by the four operations (i.e. insertion, deletion, substitution of one letter or the transposition of two adjacent letters). This phenomenon was highlighted by a study conducted in (Ben Othmane Zribi, Chiraz, and Mohamed Ben Ahmed. 2003. "Efficient automatic correction of misspelled Arabic words based on contextual information, Lecture Notes in Computer Science." Springer 2773: 770-777, incorporated herein by reference). They took each and every word from the dictionary and applied the four editing operations (insertion of a letter, deletion of a letter, substitution of a letter with another letter and interchanging two adjacent letters).

They calculated the number of correct word forms obtained by applying the four operations. They found that Arabic words are more similar to each other compared to words from other languages such as English and French. It was reported that the average of Arabic word similarity is 10 times greater than English and 14 times greater than French. This gives an indication of the difficulty of treating the problem of real-word errors in Arabic language.

FIG. 1 demonstrates an example of several real-words driven from the word ' أمر ' 'Amer' which translates to 'command', it demonstrates the insertion, deletion, substitution and transposition words related to word. Most of the researchers of spell checking and correction focused on three difficult problems: (1) non-word error detection; (2) isolated-word error correction; and (3) context-dependent word correction. Many techniques were proposed to address these problems, such as pattern-matching, N-gram analysis techniques, dictionary look up techniques, minimum edit distance, similarity key techniques, probabilistic and rule based techniques (Kukich, Karen. 1992. "Technique for automatically correcting words in text." ACM Computing Surveys 24(4): 377-439, incorporated herein by reference).

A non-word may be defined as a sequence of letters that is not a defined word in the language (dictionary). Research on non-word error detection started in the early 1970s. Most of the research conducted for detecting and correcting non-word errors are based on n-gram analysis and dictionary lookup techniques (Kukich, Karen. 1992. "Technique for automatically correcting words in text." ACM Computing Surveys 24(4): 377-439, incorporated herein by reference). (Brill, Eric, and Robert C. Moore. 2000. "An improved error model for noisy channel spelling correction." Proceedings of the 38th Annual Meeting on Association for Computational Linguistics—ACL '00: 286-293, incorporated herein by reference) proposed an improved model for spelling correction using the noisy channel model and Bayes' rule. The model used dynamic programming algorithm for finding edit distance between a misspelled word and a dictionary word. (Lehal, Gurpreet Singh. 2007. "Design and Implementation of Punjabi Spell Checker." International Journal of Systemics, Cybernetics and Informatics: 70-75, incorporated herein by reference) designed and implemented a Punjabi spell checker that detects and corrects non-word errors. He first created a lexicon of correctly spelled words in order to check the spellings as well as to generate suggestions. All the possible forms of words of Punjabi lexicon were sorted then partitioned into sixteen sub-dictionaries based on the word length. Secondly, dictionary lookup technique was used to detect misspelled words. After identifying the misspelled words, reverse minimum edit distance between a misspelled word and a dictionary word was used to generate a list of candidate words.

Real-word errors are typing errors that result in a token that is a correctly spelled word, although not the one that the user intended. Work on real-word detection and correction began in the early 1980s (Kukich, Karen. 1992. "Technique for automatically correcting words in text." ACM Computing Surveys 24(4): 377-439, incorporated herein by reference). (The Unix Writer's Workbench package L. Cherry, and N. Macdonalil. 1983. "The Writer's Workbench software Byte." 241-248, incorporated herein by reference) represents one of the first efforts that addressed real word errors detection and correction in text. It flags common grammatical and stylistic errors and suggests possible corrections (Kukich, Karen. 1992. "Technique for automatically correcting words in text." ACM Computing Surveys 24(4): 377-439, incorporated herein by reference). The problem of real-word errors has been discussed in two different perspectives, the first one; researchers have considered this problem as the resolution of lexical disambiguation. Pre-established sets of words that are commonly confused with each other called the confusion sets, like {' كثير ', ' كبير '}, were used. A word is simply suspicious when a member of its confusion set better fits in its context. The correction is made by selecting the most likely member in that set considering the context. The second nature of research is not tied to predefined confusion sets as in the first one. Other methods that use the context to detect and correct real-word errors by applying unsupervised techniques based on semantic, syntactic or probability information was used.

(Golding, A. 1995. "A Bayesian Hybrid Method for Context-Sensitive Spelling Correction." Proceedings of the 3rd Workshop on Very Large Corpora, Boston, Mass.: 39-53, incorporated herein by reference) is the originator of lexical disambiguation using predefined confusion sets. 18 confusion sets of commonly confused words provided by the Random House Unabridged Dictionary (Flexner, B. 1983. "Random House unabridged dictionary." (2nd ed.). New York: Random House, incorporated herein by reference) were used. Based on a Bayesian hybrid method for real-word spelling correction by identifying the presence of particular words surrounding the ambiguous word. (Golding, A, and Y Schabes. 1996. "Combining Trigram-based and Feature-based Methods for Context-Sensitive Spelling Correction." Proceedings of the 34th annual meeting on Association for Computational Linguistics: 71-78, incorporated herein by reference) proposed a method called Tribayes. When an occurrence of a word belonging to any of the confusion sets in the test set is examined, Tribayes substitutes each word from the confusion set into the sentence. For each confusion set member, the method calculates the probability of the resulting sentence based on Part-Of-Speech (POS) trigrams. It selects the word that makes the sentence having the highest probability as a correction. (Bergsma, Shane, Dekang Lin, and Randy Goebel. 2008. "Web-Scale N-gram Models for Lexical Disambiguation." In Proceedings of the Twenty-First International Joint Conference on Artificial Intelligence, p. 1507-1512, incorporated herein by reference) presented a method on Web-Scale N-gram Models for lexical disambiguation. They used supervised and unsupervised systems that combined information from multiple and overlapping segments of context. The method was used on three tasks viz. preposition selection, context-sensitive spelling correction and non-referential pronoun detection. (Fossati, Davide, and Barbara Di Eugenio. 2007. "A Mixed Trigrams Approach for Context Sensitive Spell Checking" ed. Alexander Gelbukh. Computational Linguistics and Intelligent Text Processing 4394: 623-633, incorporated herein by reference) proposed a method of mixed tri-grams model that combines the word-tri-grams model and POS-tri-gram model. Confusion sets for all words in the vocabulary using minimum edit distance were defined. Islam, Aminul, and Diana Inkpen. 2009. "Real-word spelling correction using Google Web IT 3-grams." Proceedings of the 2009 Conference on Empirical Methods in Natural Language Processing Volume 3—EMNLP '09 3 (August): 124, incorporated herein by reference) presented a method for detecting and correcting multiple real-word spelling errors including a normalized and modified version of the string matching algorithm, Longest Common Subsequence (LCS), and a normalized frequency value.

The technique is applied using Google web 1T 3-gram dataset and first tries to determine some possible candidates and then sorts them based on string similarity and frequency value in a modified version. The technique selects the best one of these candidates. Google 3-grams are proved to be very useful in detecting and correcting real-word errors. (Verberne, Suzan. 2002. "Context-sensitive spell checking based on word trigram probabilities Context-sensitive spell checking based on word trigram probabilities." Master's thesis, University of Nijmegen, February-August, incorporated herein by reference) proposed a tri-gram-based method for real-word error detection and correction, using the British National Corpus. The used technique assumes that if a word tri-gram is not in the British National Corpus then it has an error, otherwise it is considered correct without using the probability information of the tri-gram. However, not every seen tri-gram in the training set is correct; there were some cases in which the tri-gram was not correct in a given context.

Research on spell checking of Arabic language increased dramatically in recent years due to the increased demand for Arabic applications that require spell checking and correction facilities. Few Arabic spell checking research has been reported on non-word error detection and correction and fewer on real-word error detection and correction. In this section, we present some work on Arabic spell checking. Haddad, B, and M Yaseen. 2007. "Detection and Correction of Non-Words in Arabic: A Hybrid Approach." International Journal of Computer Processing of Oriental Languages (IJCPOL) 20(4): 237-257, incorporated herein by reference) presented a hybrid model for non-word Arabic detection and correction. Their work was based on semi-isolated word recognition and correction techniques considering the morphological characteristics of Arabic in the context of morpho-syntactical, morphographemic and phonetic bi-gram binary rules. Their hybrid approach utilized morphological knowledge in the form of consistent root-pattern relationships and some morpho-syntactical knowledge based on affixation and morphographemic rules recognize the words and correcting non-words. (Hassan, A, H Hassan, and S Noeman. 2008. "Language Independent Text Correction using Finite State Automata." Proceedings of the 2008 International Joint Conference on Natural Language Processing (IJCNLP), incorporated herein by reference) proposed an approach for correcting spelling mistakes automatically. Their approach used finite state techniques to detect misspelled words. They assumed that the dictionary is represented as deterministic finite state automata. They build a finite state machine (FSM) that contains a path for each word in the input string. Then the difference between generated FSM and dictionary FSM is calculated. (Ben Othmane Zribi, C., Hanene Mejri, and M. Ben Ahmed. 2010. "Combining Methods for Detecting and Correcting Semantic Hidden Errors in Arabic Texts." Computational Linguistics and Intelligent Text Processing: 634-645, incorporated herein by reference) proposed a method for detecting and correcting semantic hidden errors in Arabic text based on their previous work of Multi-Agent-System (MAS) (Ben Othmane Z C Ben Fraj F, Ben Ahmed M. 2005. "A Multi-Agent System for Detecting and Correcting 'Hidden' Spelling Errors in Arabic Texts." In Proceedings of the 2nd International Workshop on Natural Language Understanding and Cognitive Science NLUCS, ed. Bernadette Sharp. INSTICC Press, p. 149-154, incorporated herein by reference). Their technique is based on checking the semantic validity of each word in a text. They combined four statistical and linguistic methods to represent the distance of each word to its surrounding context. These methods are co-occurrence-collocation, context-vector method, vocabulary-vector method and Latent Semantic Analysis method. A list of all candidates is maintained and substituted with the erroneous word forming a set of candidate sentences. Sentences with semantic anomalies are eliminated from the list using the detection module of the system. The remaining sentences are then sorted using combined criteria of classification namely, typographical distance, proximity value and position of error. (Shaalan, K, R Aref, and A Fahmy. 2010. "An Approach for Analyzing and Correcting Spelling Errors for Non-native Arabic learners." In the Proceedings of the 7th International Conference on Informatics and Systems, INFOS2010, Cairo, p. 53-59, incorporated herein by reference) proposed an approach for detecting and correcting non-word spelling errors made by non-native Arabic learners. Buckwalter's Arabic morphological analyzer to detect the spelling errors was used. To correct the misspelled word, the edit distance techniques in conjunction with rule-based transformation approach were utilized. Edited distance algorithm to generate all possible corrections and transformation rules to convert the misspelled word into a possible word correction was used. The rules were based on common spelling mistakes made by Arabic learners. After that, a multiple filtering mechanism to reduce the proposed correction word lists was applied. (Al-kanhal, Mohamed I., Mohamed A. Al-Badrashiny, Mansour M. Alghamdi, and Abdulaziz O. Al-Qabbany. 2012. "Automatic Stochastic Arabic Spelling Correction with Emphasis on Space Insertions and Deletions." IEEE Transactions on Audio, Speech, and Language Processing 20(7): 2111-2122, incorporated herein by reference) presented a stochastic-based technique for correcting misspelled words in Arabic texts, targeting non word-errors. They also considered the problem of space insertion and deletion in Arabic text. Their system consists of two components, one for generating candidates and the other for correcting the spelling error. In the first component, the Damerau-Levenshtein edit distance was used to rank possible candidates for misspelled words. This component also addresses merged and split word errors by utilizing the A* lattice search and 15-gram language model at letter level to split merged words. For the split words the component finds all possible merging choices to produce the correct word. In the second component they used the A* lattice search and 3-gram language model at the word level to find the most probable candidate. (Ben Othmane Zribi, C., and M. Ben Ahmed. 2012. "Detection of semantic errors in Arabic texts." Artificial Intelligence 1: 1-16, incorporated herein by reference) proposed an approach for detecting and correcting real-word errors by combining four contextual methods. Statistics and linguistic information to check whether the word is semantically valid in a sentence was used. Errors that cause total semantic inconsistencies were focused on; this can be considered as a limitation as they ignored partial semantic inconsistencies and semantic incompleteness errors. In addition they assumed that a sentence can have one error at most. Moreover, the used corpus is relatively small (1,134,632 words long) containing only economics articles (i.e. no variations in topics).

A dataset is an essential resource that is used in spell checking research. The used data set passed through two main phases, the first phase is data collection and preparation in which the corpus was collected and made the preprocessing needed; the second phase is building the language models, dictionary generation, and collecting the confusion sets. Benchmarking Arabic datasets for spell checking and correction are unknown. Manual collection of data is time consuming and error prone, hence the 'Crawler' was developed. Crawler is a program that is able to collect a huge amount of data from web sites. Al-Riyadh newspaper website was chosen in this work as it contains multiple topics. Topics are obtainable at the archived library of the web site, topics of the collected dataset are sport, health and economics, the Crawler program is also able to fetch data from other sources if needed. A large corpus was collected from Al-Riyadh newspaper on three topics, namely health, economic and sport of (4,136,833), (24,440,419) and (12,593,426) words each, taken from (7,462), (49,108), (50,075) articles respectively. It is assumed that this data is error free and will take words with above a minimum number of occurrences.

The Crawler was used to extract the body texts automatically (i.e. only the articles body texts were extracted without the articles titles). The total sizes for the Health, Economic and Sport corpora are 42 MB, 261 MB and 131 MB, respectively. Table 2 shows the statistics of an Al-Riyadh newspaper corpus for the three topics. A smaller corpus that was collected in (Mandi, Adnan. 2012. "Spell Checking and Correction for Arabic Text Recognition." Master's thesis, KFUPM University, Department of Information & Computer Science, incorporated herein by reference) was added to the main corpus. This corpus consists of Arabic texts collected from different subjects such as news, short stories, and books. In addition, Arabic Gigaword Third Edition, a rich corpora compiled from different sources of Arabic newswire, Corpus of Contemporary Arabic (CCA), a corpus collected by (Latifa AlSulaiti Al-Sulaiti, L. 2004. "Designing and Developing a Corpus of Contemporary Arabic." Master's thesis, School of Computing in the University of Leeds, incorporated herein by reference), and Watan-2004 corpus which contains about 20000 different articles from different topics were also used. In addition, the text of the Holy Quraan was added to the corpus in estimating the n-gram models to correct errors in writing Ayahs of Quraan. These corpora were combined and added to form one complete corpus of 10,820,312 words of total size of 124 MB. For more details about this added corpus reference may be made to (Mandi, Adnan. 2012. "Spell Checking and Correction for Arabic Text Recognition." Master's thesis, KFUPM University, Department of Information & Computer Science, incorporated herein by reference). This corpus consists of Arabic texts collected from different subjects such as news, short stories, and books. All these corpora are combined into a single comprehensive corpus of size of 508 MB. The corpus was normalized by removing diacritics, numbers, symbols and punctuation marks, English letters were also removed from the corpus. Detailed information for each corpus is shown in Table. 2.

TABLE 2

Statistics for the compiled corpus

| Topic | Number words | Number of articles | Size on disk | Source |
|---|---|---|---|---|
| Health | 4,136,833 | 7,462 | 42 MB | Al-Riyadh |
| Sport | 12,593,426 | 50,075 | 131 MB | Al-Riyadh |
| Economic | 24,440,419 | 49,108 | 261 MB | Al-Riyadh |
| News | 9,025,403 | NA | 69.7 MB | (Mandi 2012) |
| Stories | 106,185 | NA | 5.1 MB | (Mandi 2012) |
| Medicine | 612,824 | NA | 5.4 MB | (Mandi 2012) |
| History | 236,370 | NA | 2.76 MB | (Mandi 2012) |
| Varity of topics | 750,131 | NA | 4.8 MB | (Mandi 2012) |
| General | 51,990,990 | NA | 508 MB | All previous |

FIG. 1 shows the number of words in each topic in the corpus. Table. 3 shows a sample of the number of words' occurrences in the corpus sorted in a descending order.

TABLE 3

Sample of number of words' occurrences in the corpus

| Word | Count | Word | Count | Word | Count |
|---|---|---|---|---|---|
| في | 352127 | الإنسان | 3726 | الشامل | 689 |
| من | 282292 | الوطنية | 3708 | الحقيقي | 688 |
| على | 155428 | لقد | 3662 | اندية | 687 |
| أن | 153057 | المختلفة | 3654 | الامام | 687 |
| الى | 119263 | الخارجية | 3631 | الإعداد | 687 |
| التي | 69378 | اهمية | 3614 | الخابورة | 687 |
| عن | 55429 | المالية | 3603 | التنسيق | 686 |
| الذي | 45094 | عدة | 3598 | اليد | 685 |
| مع | 43445 | الشركات | 3598 | يعتمد | 685 |
| ... | ... | ... | ... | ... | ... |
| ... | ... | ... | ... | ... | ... |

Generated dictionaries of words were formed from a collected corpus. All the words from the corpus were extracted and their occurrences were counted. The words were sorted in a descending order based on their number of occurrences. Different dictionaries of different sizes were generated from distinct words with respect to the number of occurrences as shown in Table. 4.

TABLE 4

Statistics of the dictionaries

| Dictionary | Minimum # of occurrences | Dictionary size |
|---|---|---|
| Dictionary 1 | 1 | 576,793 |
| Dictionary 2 | 2 | 324,456 |
| Dictionary 3 | 5 | 187,312 |
| Dictionary 4 | 10 | 128,684 |
| Dictionary 5 | 20 | 88,645 |
| Dictionary 6 | 50 | 52,754 |
| Dictionary 7 | 100 | 34,461 |

For instance, the total number of words in dictionary 5 is 88,645, each word is repeated at least 20 times. Naturally the dictionary size decreases as the minimum number of occurrences increases. For example, dictionary 1 is larger than dictionary 2 and so on. However, the correctness of words in the smaller dictionaries is higher than that in the larger ones. For instance, the words 'سسيجارة' in dictionary 1 and the word 'ردولار' in dictionary 2 are mistyped although it was assumed that the corpus was error free. Using dictionaries with higher word occurrences results in reduced spelling errors. FIG. 2 shows a graph representation of the dictionaries and their sizes.

Statistical language models are used in many natural language processing applications such as speech recognition, machine translation, part-of-speech tagging, parsing and information retrieval. Such models try to capture the properties of the language, and may be used to predict the next word in a sentence. Many language model (LM) toolkits are used to build statistical language models. Among these is the SRILM Toolkit[1], which is a toolkit for building and applying statistical language models (LMs). SRILM was primarily used for speech recognition, statistical tagging and segmentation, and machine translation (Stolcke, A. 2002. "SRILM—An Extensible Language Modeling Toolkit." Intl. Conf. on Spoken Language Processing, incorporated herein by reference). Using the SRILM Toolkit, the n-gram language models of the created corpus is generated. The language models consist of uni-grams, bi-grams and tri-grams. SRILM is also helpful in generating the dictionaries for the corpus as it counts the number of words' occurrences.

A collection of confusion sets is normally used in addressing real-word errors in case of supervised learning techniques. There are several ways to obtain the confusion sets. One way is to find words from dictionary that have one letter variation from others Mays, Eric, (Fred J. Damerau, and Robert L. Mercer. 1991. "Context based spelling correction." Information Processing & Management 27(5): 517-522, incorporated herein by reference). {'علم', 'قلم'} is an example of this type of confusion sets. Another way to find such sets is to gather words that have the same pronunciation (Golding, A. 1995. "A Bayesian Hybrid Method for Context-Sensitive Spelling Correction." Proceedings of the 3rd Workshop on Very Large Corpora, Boston, Mass.: 39-53, incorporated herein by reference), (Golding, Andrew R, and Dan Roth. 1996. "Applying Winnow to Context-Sensitive Spelling Correction." Machine Learning, arXiv preprint cmp-1g/9607024: 182-190, incorporated herein by reference). For example, {'ناظرة', 'ناضرة'},

TABLE 5

The eighteen collected confusion sets misrecognized by the OCR

| Confusion Set | No. of occurrences of each word | No. of occurrences in the corpus |
|---|---|---|
| مصر – مضر | 667-6544 | 7211 |
| القرعة – الفرحة | 188-797 | 985 |
| الرسم – الرحم | 2749-1091 | 3840 |
| مال – حال | 11641-3267 | 14908 |
| يفرق – يغرق | 52-177 | 229 |
| عسل – غسل | 803-327 | 1130 |
| الشرق – الحرق – الأرق | 470-109-9959 | 10538 |
| الرملة – الرحلة | 854-0 | 854 |
| العتيقة – العريقة | 480-23 | 503 |
| تدخنت – تدخلت | 129-1 | 130 |
| الإسهال – الإهمال | 211-519 | 730 |
| مسحوق – مسبوق | 647-511 | 1158 |
| يعصر – يصر | 206-20 | 226 |
| عروق – حروق | 60-66 | 126 |
| موضع – مرضع | 5-768 | 773 |
| حيران – حيوان | 108-5 | 113 |
| العارضة – الأرضة | 4-1116 | 1120 |
| يلغ – يبلغ | 5605-12 | 5617 |

In the development sets from both types were collected in two ways. In the first type words recognized wrongly by an Arabic OCR system were used (i.e. words that are recognized as correctly spelled words by the OCR system while they were not the same words in the original text). Table. 5 shows a sample of the confusion sets wrongly recognized by the OCR system. The corpus taken from (Mandi, Adnan. 2012. "Spell Checking and Correction for Arabic Text Recognition." Master's thesis, KFUPM University, Department of Information & Computer Science, incorporated herein by reference) was excluded as it contains the text of the Holy Quran. Not all confusion sets in the Table are used in experimentation, some are ignored because there is no sufficient occurrences for one of the confusion set words as in {' الرملة', 'الرحلة'}, where the word ' لرملة ' has not occurred in the collected corpus. The same case for {' تدخنت', 'تدخلت '} in which the word ' تدخنت ' occurs only once in the corpus. In the second type, the confusion sets by gathering words that have the same sound were obtained; a set of the most common confused words made by non-native Arabic speakers was collected.

TABLE 6

Shows some common spelling mistakes committed by non-native Arabic speakers.

| Original letter | Replaced letter | Examples | |
|---|---|---|---|
| ع | أ | إمارة | عمارة |
|  |  | أمّ | عمّ |
|  |  | الأرض | العرض |
|  |  | أنّ أو أنْ | عنّ (ظهر) |
| ح | هـ | سهنة | محنة |
|  |  | هتّام | حتّام |
|  |  | هاوية | حاوية |
|  |  | همزة | حمزة |
| ث | س | أساس | أثاث |
|  |  | إسم | إثم |
|  |  | سلامة | ثلاثة |
| ش | س | البشر | البسر |
|  |  | شراب | سراب |
|  |  | الشكر | السكر |
| ظ,ض | ز,د | مضمار | مزمار |
|  |  | رضي | ردي |
|  |  | الظهور | الزهور |
| ص | س | مصير | مسير |
|  |  | إصرار | إسرار |
|  |  | يصبّ | يسبّ |
| ط | ت | الطلاق | التلاق |
|  |  | مسطور | مستور |
| خ | ح | يختفي | يحتفي |
| ذ | د | ينفذ | ينفد |

At the beginning of this list, misspelling generalities that should be stated are included. The words are collected and classified into groups according to their sounds (place of articulation), resulting from the nearness of some letters sounds which cause confusion with other words of different meanings. Another group is changing one character that results in changing the word meaning with no similarity between letters in sound, this is known in the science of rhetoric as anagram, for instance ' يحتفي ', ' يختفي ' and ' ينفذ ', ' ينفد '. A sample of nineteen confusion sets from non-native Arabic speakers is shown in experiments results.

TABLE 7

Nineteen confusion sets from non-native Arabic speakers

| Confusion Set | No. of occurrences of each word | Total No. of occurrences in the corpus |
|---|---|---|
| كبير – كثير | 7203-25366 | 32569 |
| صغير – قصير | 803-989 | 1792 |
| أساس – أثاث | 139-3713 | 3852 |
| عمارة – إمارة | 1526-310 | 1836 |
| ثمن – سمن | 27-1225 | 1252 |
| أشعار – أسعار | 27930-465 | 28395 |
| تسير – تصير | 48-1648 | 1696 |
| إسرار – إصرار | 570-278 | 848 |
| الزهور – الظهور | 825-359 | 1184 |
| هاوية – حاوية | 349-25 | 374 |
| سراب – شراب | 204-36 | 240 |
| مسير – مصير | 660-23 | 683 |
| محنة – مهنة | 1147-29 | 1176 |
| يسب – يصب | 540-5 | 545 |
| أم – علم | 2291-1392 | 3683 |
| السعر – الشعر | 2819-4250 | 7069 |
| الأرض – العرض | 7140-4950 | 12090 |
| السكر – الشكر | 2581-3387 | 5968 |
| ثلاثة – سلاسة | 89-2204 | 2293 |

Table. 7 shows the confusion set of this type, more words can be added to the list in a later stage. Additional sets generated by non-word Arabic spell checker that corrects non-words to real-word errors not intended by the user have also been obtained.

Real word error detection and correction using N-Gram language models; language modeling is used in many natural language processing applications such as speech recognition, machine translation, part-of-speech tagging, parsing and information retrieval are just some examples. To the best of knowledge, there is no completely unsupervised approach or method of correcting text containing real-word errors in Arabic text, either using syntactic or semantic information of the language. The problem of real-word errors in Arabic text can be address using an unsupervised technique in which n-gram language models can be used to detect and correct real-word errors.

N-gram statistical language models try to capture the properties of a language and to predict the next word in a sentence. They assign probability to a sequence of n words $P(w_1, w_2, \ldots, w_n)$ by means of probability distribution. In a tri-gram model, the probability of a sequence of n words $\{w_1, w_2, \ldots, w_n\}$ is given by:

$$P(S) = P(w_1)P(w_2|w_1)P(w_3|w_1w_2)\ldots P(w_n|w_{n-2}w_{n-1}) = \prod_{i=1}^{n} P(w_i|w_{i-2}w_{i-1})$$

Where P(s) is the probability of the sentence, $P(w_1)$ is the probability of $w_1$, $P(w_2|w_1)$ is the probability of $w_2$ given $w_1$, and so on. Using the tri-gram model, the ability to detect as well as to correct words in error in a given context can be made. For instance, if the word ' الخبز ' is replaced with the word ' الخبر ' the application will be able to detect this error as the tri-gram ' أكل الولد الخبز ' is more likely to appear than ' أكل الولد الخبر '. Building well trained language models requires a huge corpus to capture the language properties as well as to estimate the probabilities of the n-grams. The general corpus that combines all the collected texts is used in building the language models (LMs). The LMs statistics of the corpus are shown in table. 8.

TABLE 8

LMs statistics of the corpus

| Number of words | Uni-grams | Bi-grams | Tri-gram |
|---|---|---|---|
| 51,990,990 | 576,796 | 13,196,695 | 30,587,630 |

A method of for real-word error detection and correction for Arabic text in which N-gram language models (from uni-grams to tri-grams) is proposed using two primary modules, one that detects real-word errors in a context and the second corrects the errors detected by the error detection module. For the error detection module an algorithm for detecting real-word errors using the n-grams language models is used to find suspicious words in a given text by checking the availability of the tri-grams in a sentence. To detect suspicious words in a sentence, the algorithm checks for the presence of the tri-grams $\{w_{i-2}, w_{i-1}, w_i\}$ to validate $w_i$ in the target sentence by looking it up in the tri-gram language model. It is assumed that the first word in the sentence is correct and there should be at least three words in each sentence to be treated. If the tri-gram is not found, the algorithm further checks for the availability of the two bi-grams $\{w_{i-1}, w_i\}$ and $\{w_i, w_{+1}\}$ in the bi-gram language model, if both of them are not found, provided that $w_{i-1}$ and $w_{i+1}$ are not frequent words (i.e. frequent words have high possibility to come with many words) in this case, then $w_i$ is considered suspicious. Once all suspicious words are flagged, the second step is to verify whether they are true errors or not. For each suspicious word s, we find all its spelling variations $\{v_i, v_2, \ldots, v_n\}$. The spelling variations of a word w is defined to be the words in the dictionary that are derived from w by insertion, deletion, or replacement of one character, or the transposition of two adjacent characters. Dictionary 7 is used to find the spelling variations for a suspicious word[2]. Each time the suspicious word s is replaced by one of its spelling variations $w_i$ and its probability is calculated. Five words are actually considered in the sentence, two words to the left of the word ($w_{i-2}, w_{i-1}$) the word itself and two words to the right ($w_{i+1}, w_{i+2}$). For example, if $v_i$ is one of the suspect word variations, the three tri-grams that make the difference in calculating the probability are considered which are $\{w_{i-2}, w_{i-1}, w_i\}$, $\{w_{i-1}, w_i, w_{i+1}\}$, and $\{w_i, w_{i+1}, w_{i+2}\}$. The log probabilities of these three tri-grams to calculate the probability of the five words sequence is added. The same is done for all $w_i$ variations. In a case that the tri-gram is not found, bi-grams back off is used. For instance if the tri-gram $\{w_{i-i}, w_i, w_{i+1}\}$ is not found then a back off to the two bi-grams $\{w_{i-1}, w_i\}$ and $\{w_i, w_{i+1}\}$ takes place, and if a bi-gram is not found then a further back off to the uni-grams of each word in that bi-gram takes place. For example, if the latter bi-gram is not found, the two uni-grams $w_i$ and $w_{i+1}$ are considered in the calculation. The highest probability obtained by the most probable spelling variation in the context is compared with the probability of the original word (i.e. the suspicious word). If the probability of the former is higher than the later, we take this as an indication that the variation is more likely to be the intended word and the suspicious word is raised as a detected real-word error. FIG. 3 illustrates the error detection algorithm, the module is used to correct the errors detected by error detection module. In order to correct a misspelled word, the correction module: (1) generates a list of candidate words; (2) generates candidate sentences using the candidate words; (3) ranks the candidate sentences; and (4) possibly replaces the sentence with a candidate with the highest probability.

FIG. 4 illustrates a proposed error correction algorithm for words detected using an error detection algorithm, such as the error detection algorithm illustrated in FIG. 3. Once a word has been detected as an error, candidate correction words are generated in order to correct it. A number of algorithms have been used for finding candidate corrections in the literature. The minimum edit distance is by far the most popular one. The minimum edit distance is the minimum number of editing operations (i.e. insertions, deletions, substitutions and transposition) required to transform one string into another. (Damerau, Fred J. 1964. "A technique for computer detection and correction of spelling errors." Communications of the ACM 7(3): 171-176, incorporated herein by reference) implemented the first minimum edit distance based spelling correction algorithm based on the first three types of character transformation, (Levenshtein, V. 1966. "Binary Codes Capable of Correcting Deletions and Insertions and Reversals." Soviet Physics Doklady 10(8): 707-710, incorporated herein by reference) developed a similar algorithm for correcting deletions, insertions and transpositions. (Wagner, Robert A, and Michael J. Fischer. 1974. "The String-to-String Correction Problem." Journal of the ACM 21(1): 168-173, incorporated herein by reference) generalized the technique to cover also multi-error misspellings. To correct a detected error, the spelling variation of that error which would fit better into the context than the original word is searched for. All word variations for each detected error (i.e. words that have a minimum edit distance of one from the erroneous word) are fetched from the dictionary. These variations are considered as candidate corrections for the erroneous word. For example, in the sentence:

'وقالت الشركات الثلاث في بيانات صحية أمس أن التغطية التأمينية'

The word ' صحية ' is erroneous and its variations in the dictionary are shown in Table 9. (Detected errors by the detection module will be referred to as erroneous word).

TABLE 9

The word 'صحية' variations

| صحيحة | صحيفة | وصحية |
|---|---|---|
| صحياً | ضحية | صحيح |
| صحي | حية | نحية |
| صحفية | صحة | صحوة |

After generating candidate words, new sentences are formed by replacing each erroneous word by all of its variations. Probabilities of new sentences in addition to the original sentence are calculated, a sentence that gives the highest probability is considered as the correct one.

An indication is taken that the word variation in that sentence is a better fit to the context and hence more likely to be the intended word; this is the case with a fully automated system. Five words are actually considered in the sentence, as in the detection phase, for example, if $w_i$ is the erroneous word, the three tri-grams that make the difference in calculating the probability are considered (viz. $\{w_{i-2}, w_{1-1}, wi\}$, $\{w_{i-1}, w_i, w_{i+1}\}$, and $\{w_i, w_{i+1}, w_{i+2}\}$). We add the log probabilities of these three tri-grams to calculate the probability of the five word sequence. The log of probability is used to avoid underflow and to save computation time by using addition instead of multiplication. The same is done for all $w_i$ variations. If the tri-gram is not found, bi-grams back off is used. For instance if the tri-gram $\{w_{i-1}, w_i, w_{i+1}\}$ is not found we back off to the two bi-grams $\{w_{i-1}, w_i\}$ and $\{w_i, w_{i+1}\}$, and if a bi-gram is not found we further back off to the uni-grams of the words of that bi-gram. For example, if the latter bi-gram is not found, the two uni-grams $w_i$ and $w_{i+1}$ are considered in the calculation.

For the previous example 'بيانات صحية أمس أن التغطية التأمينية وقالت الشركات الثلاث فى' with a suspicious word 'صحية', the three tri-grams which make the difference in the probability calculation are:

في بيانات صحية

بيانات صحية أمس

صحية أمس أن

The probability for the original sentence is calculated. Then the erroneous word 'صحية' is replaced each time with one of its variations, in this case twelve variations for the word 'صحية' resulting in twelve different sentences. For instance, the suspect word 'صحية' is replaced with word 'ضحية' forming a new sentence 'بيانات ضحية أمس أن التغطية التأمينية وقالت الشركات الثلاث في'.

Because the remaining words are the same, their probabilities will be the same. Hence, the calculation is done only for the following three tri-grams:

في بيانات ضحية

بيانات ضحية أمس

ضحية أمس أن

The same is done for all variations in Table 4. The variation that gave the highest probability is 'صحفية' which was the correct replacement for the erroneous word 'صحية'; therefore the correct sentence is:

'. وقالت الشركات الثلاث في بيانات صحفية أمس أن التغطية التأمينية'

In the case of interactive systems, the list of candidate words is ranked such that the most probable one comes first (considering the context). The user is provided with the top n suggestions for choosing the most suitable one. If the top two choices have equal probabilities; ranking could be based on a similarity measure, like minimum edit distance between the suggestions and the erroneous word. In other words, the candidate correction that has the smallest minimum edit distance with the erroneous word will have the highest rank and will be put at the top of the suggestion list. Ranking could also be based on suggested word n-gram frequencies. For example, the frequency of 'من' is higher than the frequency of 'منذ', so 'من' is ranked higher than 'منذ'. Minimum edit distance and word n-gram frequency can be combined together. In case of equal minimum edit distance, the most frequent will be considered highest or they could be interpolated to rank the candidates. In the case of fully automatic system, the detected error words are replaced with the words given in the sentence with the highest probability. However, in the case of interactive system the top n candidate words for each suspicious word are suggested to the user to choose the best correction from. In a fully automatic system, the variation that gives the highest probability in the context is compared with the original suspect word. If the variation probability in the context is higher than the original probability (with respect to a threshold value) as in Equation 2, then the variation is more likely to be the intended word and the original word is replaced with that variation. Different threshold values of 0, 0.1, 0.2 and 0.3 were attempted.

$$\frac{\text{Probability}_{Variation} - \text{Probability}_{Original}}{\text{Probability}_{Variation}} > \text{Threshold} \quad (E.2)$$

FIG. 5 shows a flow chart of the proposed method, 102 describes activating or enabling a file in the system, when the user enters text a preprocessing of the text occurs 104. The spelling error detection and correction module is able to perform an error detection using an error detection tool 106 to locate spelling errors. An error detection module 108 within the error detection tool draws upon N-gram statistics 110 to identify word errors in a sentence using probability methods, the N-gram statistics draw upon a corpus of language text 112 to detect incorrectly typed sentences. The spell detection tool continually assess the text for errors 116, if no error is found then the system loops and preprocesses the text until an error is found. When the error detection tool 106 does find an error the system activates an error correction module 118 where the error is analyzed against retrieved candidate corrections 120 from a dictionary of words 114 obtained from the corpus of Arabic text 112. The candidate corrections are ranked according to the context of the sentence 122 using the N-gram statistic models 110 to identify a best correction to the error. The best ranked correction word is selected 124 and the sentence is corrected according to the context of the text. An EOF evaluation 126 is conducted to check if the system reached the end of the file. If so then the file will be output 128, if not then the process will repeat back to the preprocessing stage.

Experimental results were recorded using the unsupervised N-gram technique. To create realistic test sets that have real-word errors, 75 articles were chosen from the Al-Arabiya website, 25 for each subject (health, sport and economic), then we automatically induced real-word errors in these articles by randomly replacing one word by one of its spelling variations (i.e. one of its confusion set members) in approximately 1 and 2 percent of total words in the text file. FIG. 6 shows some examples of the induced errors in the test sets. Dictionary 7 is used to find words' variations in the error inducing process[4]. The process of inducing errors is done six times, three times with 1% error rate and three with 2% error rate, resulting in six different test sets, three for each error rate; the error generating algorithm is shown in FIG. 7. A single character insertion, deletion, replacement, or the transposition of two adjacent characters that result in another real word. Table. 10 shows the statistics of the test sets.

TABLE 10

Statistics of the test sets

| Total number of words | Average words in each article | Number of errors | |
|---|---|---|---|
| | | Sets (1%) | Sets (2%) |
| 27,115 | 362 | 233 | 509 |

Detection recall is defined as the fraction of induced errors correctly detected (i.e. the number of correctly detected errors divided by the number of errors that should have been detected). Detection precision is defined as the fraction of detections that are correct (i.e. the number of correctly detected errors divided by the number of all detected errors). Correction recall is defined as the fraction of errors correctly amended (i.e. the number of correctly amended errors divided by the number of errors that should have been corrected). Correction precision is defined as the fraction of amendments that are correct (i.e. the number of correctly amended errors divided by the number of all corrected errors). F1-measure is also used in measuring performance and can be interpreted as a weighted average of both precision and recall. Equations 3 and 4 show the recall measure while Equations 5 and 6 show the precision measure. $F_1$-measure is shown in Equation 7.

$$\text{Recall} = \frac{\text{Number of actual detected misspelled words}}{\text{Number of all misspelled words in the data}} \quad (E.3)$$

$$\text{Recall} = \frac{\text{true positives}}{(\text{true positives} + \text{false negatives})} \times 100 \quad (E.4)$$

$$\text{Precision} = \frac{\text{Number of actual detected misspelled words}}{\text{Total number of detected words}} \quad (E.5)$$

$$\text{Precision} = \frac{\text{true positives}}{(\text{true positives} + \text{false positives})} \times 100 \quad (E.6)$$

$$F_1 - \text{measure} = \frac{2 * \text{Precision} * \text{Recall}}{\text{Precision} + \text{Recall}} \times 100 \quad (E.7)$$

FIG. 8 shows some examples of successful corrections, false positive, false negative and true positive detection, false positive correction.

TABLE 11

Example of TP, FN and FP in a test set with 233 errors

| | Detection | Correction |
|---|---|---|
| TP | 168 | 134 |
| FN | 65 | 99 |
| FP | 2436 | 2470 |

Table. 11 shows an example of true positives (TP), false negatives (FN) and false positives (FP) in a test set with 233 total errors.

TABLE 12

Results on the test sets

| | Detection | | | Correction | | |
|---|---|---|---|---|---|---|
| Threshold | R | P | F | R | P | F |
| 0 | 76.2% | 7.8% | 13.9% | 70.7% | 6.0% | 10.9% |
| 0.1 | 66.5% | 10.8% | 18.1% | 61.4% | 8.9% | 15.0% |
| 0.2 | 63.2% | 11.7% | 19.4% | 58.4% | 9.7% | 16.4% |
| 0.3 | 60.5% | 12.3% | 20.2% | 56.0% | 10.4% | 17.3% |

Table. 12 shows the average results of all test sets for different threshold values. Detection and correction recall, precision and F1 measure are presented in the Table. 60.5% to 76.2% of all real-word errors were detected using our prototype, 56% to 70.7% of the detected real-word errors have been correctly amended. Unfortunately, precision is very low, only 7.8% to 12.3 of total detected errors are rightly detected. This point is addressed below. The table shows low precision rates that are caused by the large number of false positive detections.

TABLE 13

Different cases of false positives

| False Positive | Amending | interpretation |
|---|---|---|
| لوميجا | أوميغا | Proper noun |
| السيلكون | السيليكون | Proper noun |
| الباتيا | اسبانيا | Proper noun |
| الخضراوات | الخضروات | Non-word error |
| مليارا | مليار | Grammatical error |
| خطاء | خطأ | Real-word error |
| بدر | بندر | Proper noun |
| تعتبرهي | تعتبره | Run on error |
| ستعيد | سيعيد | Different pronoun |
| يقتولون | يقتلون | Non-word error |
| الشرتان | الشريان | Proper noun |
| الأونه | الأونة | Non-word error |
| واشطن | واشنطن | Proper noun |
| الحميضي | الحميدي | Proper noun |
| لصحيفة | لصحيفة | Kashida |
| محمود | محمد | Proper noun |

Table. 13 shows some examples of false positives with their causes. In experimentation it was observed that some of the false positives were non-word errors that were detected and corrected by the prototype. It was assumed that the test sets were non-word error free, but it was discovered that there were some non-word errors. For example, 'الخضراوات' was replaced with 'الخضروات' and 'وايدا الرشيد امله' was corrected by 'أمله وايدي الرشد'. These were correctly detected and corrected by our prototype, so that is a proof that our method can work with non-word errors as well. Other false positives are proper nouns that are replaced based on their high probability; replacing 'محمود' with 'محمد' is an example of this proper noun false positive, another example is replacing 'لوميجا' with 'أوميغا'. Grammatical false positive errors are also detected as in 'الأونه' which was replaced with the word 'الأونة'. There are also some real-word errors in the original text that were detected by our prototype as in 'خطاء' which is actually a real word error; the intended word was 'تعتبرهي'. A run on error was also detected 'خطاً' in which the typist missed a space in between the two word 'تعتبر' and 'هي'. The prototype treated it as an error and replaced it with the word تعتبره.

From experimentation the limitations of the method was discovered;

1. Although the used corpus was very large, it was still not large-enough for such types of applications. There are always many correct tri-grams in a text that are not in the tri-gram database, this is known as a data sparseness problem. The larger the corpus the better the expected results. It is viewed that if Google lunched the 1T n-grams for Arabic as it did for English languages (Thorsten, Brants, and Franz Alex. 2006. Web 1T 5-gram corpus version 1.1-2009. Web 1T 5-gram, 10 European languages version 1. Philadelphia, incorporated herein by reference) and other European languages like Czech, Dutch and Spanish, Arabic Google 1T n-grams will help as Google has huge resources for Arabic texts.

2. It was discovered that the method does not work well with proper nouns as shown.
3. Large space is needed to store the language models.

The performance comparison of the experimental results from the prototype showed promising correction recall. However, it is not possible to compare results with other published works as there is no benchmarking dataset for real-word errors correction for Arabic text. Most was done to English language; some of the results obtained in English are viewed in context-sensitive spell checking in the following text, fairness of the comparison was not determined. Low performance problem, especially low precision rate problem, in the unsupervised approaches is a problem reported by many researchers. In (Hirst, G., and A. Budanitski. 2001. "Correcting Real-Word Spelling Errors by Restoring Lexical Cohesion." Department of Computer Science, Toronto, Ontario, Canada, incorporated herein by reference), the performance of the system that detects and corrects malapropisms in English text was measured using detection recall, correction recall and precision. It was reported a detection recall varying from 23.1% to 50%, a correction recall varying from 2.6% to 8% and a precision varying from 18.4% to 24.7%. (Verberne, Suzan. 2002. "Context-sensitive spell checking based on word trigram probabilities Context-sensitive spell checking based on word trigram probabilities." Master's thesis, University of Nijmegen, February-August, incorporated herein by reference) developed a word-tri-gram method that, she considered a tri-gram to be probably wrong if and only if it does not occur in the British National Corpus. Evaluation of the method showed a recall of 51% of detection recall of 33% for correction at the price of a precision of only 5%. (St-Onge, D. 1995. "Detecting and correcting malapropisms with lexical chains." Master's thesis, University of Toronto, Computer Science Department: Also published as Technical Report CSRI-319, incorporated herein by reference) developed a method for detecting and correcting malapropisms in English text. Performance of this method using detection recall, correction recall and precision was also measured. A detection recall of 28.5% was reported, the correction recall obtained was 24.8% and the precision was 12.5%. (Mays, Eric, Fred J. Damerau, and Robert L. Mercer. 1991. "Context based spelling correction." Information Processing & Management 27(5): 517-522, incorporated herein by reference) used a tri-gram model to detect and correct real-word errors. However, the test data used to measure the performance of their spell checking prototype was not realistic as there were induced errors in the sentences chosen for testing. It was known in advance that every sentence had only one error, for that reason, the results cannot be compared to the present results. The detection recall they reported was 76% and the correction recall was 74%. (Wilcox-O'Hearn, L Amber, G Hirst, and A Budanitsky. 2008. "Real-word spelling correction with trigrams: A reconsideration of the Mays, Damerau, and Mercer model" ed. A Gelbukh. Computational Linguistics and Intelligent Text Processing 4919 (2000): 605-616, incorporated herein by reference) re-evaluated the method of (Mays, Eric, Fred J. Damerau, and Robert L. Mercer. 1991. "Context based spelling correction." Information Processing & Management 27(5): 517-522, incorporated herein by reference) to make it comparable with other methods. The method was then compared it with the WordNet-based method of (Hirst, Graeme, and Alexander Budanitsky. 2005. "Correcting real-word spelling errors by restoring lexical cohesion." Natural Language Engineering 11 (1): 87-111, incorporated herein by reference). A detection recall of 30.6%, a correction recall of 28.1% and a precision of 20.7% were obtained. All the studies show that the developed unsupervised method performs relatively well if it is considered the inflectional property and the problem of words similarity in Arabic language as previously discussed.

Real word error detection and correction using supervised techniques. Ambiguity between words can be detected by the set of words surrounding them. For instance, if the target word is ambiguous between 'سمن' and 'ثمن', observed words like 'لبيع', 'مشتريات', 'يدفع', and 'البضاعة' nearby, indicate that the target word should be 'ثمن'. Although, words such as 'تعجن', 'النباتية', and 'ملعقة' in the context more probably imply 'سمن'. This observation is the idea behind the method of context words, which is also known as word co-occurrence. 'سمن' and 'ثمن' are called a confusion set. Each word $w_i$ in the confusion set has a characteristic distribution of words that occur in its context. In order to judge an ambiguous word, the set of words surrounding it is viewed; the $w_i$'s distribution the context most closely follow are determined.

(Golding, A. 1995. "A Bayesian Hybrid Method for Context-Sensitive Spelling Correction." Proceedings of the 3rd Workshop on Very Large Corpora, Boston, Mass.: 39-53, incorporated herein by reference). The issue of detecting and correcting real-word errors is addressed in a context using two supervised methods, namely the word co-occurrence method and the n-gram language models in the following text. Word co-occurrence method uses the context words surrounding the target words from predefined confusion sets and n-gram language models.

In order to address real-word errors, information from the surrounding context is used for detecting the erroneous words as well as to correct them. We need to identify words that are semantically unrelated to their context. Afterwards, we need to find out which of the word variations is more related to that context and could be the best replacement for the erroneous (suspicious) word. Relatedness of a word to its context is determined by a measure of semantic distance initially proposed by (Jiang, Jay J, and David W. Conrath. 1997. "Semantic Similarity Based on Corpus Statistics and Lexical Taxonomy." Proceedings of International Conference Research on Computational Linguistics (Rocling X), incorporated herein by reference). A collection of confusion sets is used in addressing real-word errors using the surrounding context. Twenty eight confusion sets were used in experimentation, the confusion sets were chosen from a number of different types of confusion sets based on their availability in the corpus.

The baseline method disambiguates words in the confusion set using the Maximum Likelihood Estimate (MLE). It selects the word most encountered in the training corpus and simply ignores the context information (i.e. words are predicted by their prior probabilities). For instance, in the confusion set {'غسل', 'عسل'}, 'غسل' occurred more often than 'عسل' in the training corpus. Using MLE, the method predicts every occurrence of 'غسل' or 'عسل' in the test corpus as 'غسل' as it is more probable in the training corpus. Table 14 shows the performance of the baseline method for 28 confusion sets. The collection of confusion sets is used for evaluating the remaining methods with the same training and testing sets. Each row of the table gives the results for one confusion set: the words in the confusion set; the number of occurrences of all words in the confusion set in the training and in the test sets; the word in the confusion set that occurred most often in the training corpus along with the number of instances; and the prediction accuracy of the baseline method for the test set. Prediction accuracy is the number of times that the method predicted the correct word, divided by the total number of test cases. For example, the members of the confusion set {'كبير', 'كثير'} occurred 2770 times in the test corpus; out of which 'كبير' occurred 2183 times and 'كثير' occurred 587 times. The baseline method predicts 'كبير' each time, and thus is right 2183 times, 2183/2770=0.788, therefor the accuracy is 78.8%. The baseline method will be used for comparison with other methods.

Context Words Co-occurrence Method. Given the context words $c_j$ where j is from 1 to n using a k-word window of the target word. We need to find out the proper word $w_i$ from the confusion set that is most probable to that context. FIG. 9 shows an example of predicting a word from the confusion set {'ثمن', 'سمن'}, given a context window size of ±3 words. The probability of each word $w_i$ in the confusion set is calculated using Bayes' rule:

$$p(w_i | c_{-k}, \ldots c_{-1}, c_1, \ldots c_k) = \frac{p(c_{-k}, \ldots c_{-1}, c_1, \ldots c_k | w_i) p(w_i)}{p(c_{-k}, \ldots c_{-1}, c_1, \ldots c_k)} \quad (E.8)$$

Due to data sparseness it is difficult to estimate the probability $p(c_{-k}, \ldots c_{-1}, c_1, \ldots c_k | w_i)$. Instead, it is assumed that the presence of a word in context is independent from the presence of the others. By this assumption the estimated probability is calculated as:

$$p(c_{-k}, \ldots C_{-1}, c_1, \ldots c_k | w_i) = \Pi_{j \in -k, \ldots, -1, 1, \ldots, k} p(c_j | w_i) \quad (E.9)$$

The MLE was used to estimate the probabilities of the context words surrounding $w_i$. The number of occurrences was counted of a word $c_j$ within the context of each wi that occur within ±k words window in the training corpus. For each context word $c_j$, the probability $p(c_j | w_i)$ by dividing its number of occurrences by the total number of $w_i$ occurrences was calculated. When a word in the confusion set within a sentence was observed in the correction phase, the words within the same window were searched for. Based on the probability, the word is classified to be any of the confusion set members. The probability is calculated as follows: if a word is observed within the context of the word $w_i$, in the training phase, the log probability of that word is summed given $w_i$. The probabilities of the sentences for every word wi in the confusion set are calculated, the log of probability is used to avoid underflow and to save computation time by using addition instead of multiplication. The word in the confusion set with the highest probability is chosen. FIG. 10 shows the proposed algorithm for the training and the testing phases.

N-gram language models is a supervised technique used for real word error detection and correction. The same mechanism in the unsupervised method is followed when detecting and correcting real-word errors. The target words here are the words belonging to any of the confusion sets. To detect or to predict the proper word of the confusion set in the tested sentence, we use the same procedure followed in the unsupervised case. For each target word $w_i$ in the confusion set, the four words surrounding it are utilized to predict the proper word in that sentence. For each word in the confusion set, a new sentence is generated by placing the confusion set word in the target word. The probabilities of all the sentences with respect to the confusion set words are calculated. Three tri-grams are considered viz. $\{w_{i-2}, w_{i-1}, w_i\}$, $\{w_{i-1}, w_i, w_{i+1}\}$, and $\{w_i, w_{i+1}, w_{i+3}\}$. In case that the tri-gram is not found, bi-grams back off is used and uni-gram back off is used when a bi-gram is not found. The sentence that gives the highest probability is considered as the correct one indicating that the confusion set member in that sentence is a better choice and hence more likely to be the correct word. For example, in the sentence 'قصير عن المركز ثم بدات دفة الحوار بين الجلسات وبعد ذلك تم عرض فيلم' the word 'قصير' is the target word. The probability is calculated for three tri-grams:

عرض فيلم قصير

فيلم قصير عن

فيلم قصير عن

The same is done for the other member of the confusion set 'صغير', the sentence that gives the highest probability is considered the correct one and the confusion set member is considered the best replacement.

Here the experimental results using the above two techniques are presented, the Al-Riyadh newspaper corpus mentioned earlier in this text is used in the method experiments. Only sentences that contain words from the confusion sets are extracted and divided into 70% for training and the remaining for testing. Statistics for confusion set sentences are shown in detail in Table 14. Note that some sentences for some confusion sets are reduced because they have many occurrences. For instance, the words of the confusion set {'كبير', 'كثير'} occurred in the corpus 32,569 times but only 9,233 of sentences that contain words from this confusion set are used. Moreover we encountered some short sentences of length three or less, these sentences seem to be sub titles within the articles. These sentences are also excluded from the sentences used in the experiments.

For word co-occurrence, experimentation with window sizes of (2, 3, 5, 7, 12, and 20) was conducted, where k is half the window size. Table 15 shows the results of each window; each row in the table shows the results for one confusion set, it shows the number of context words for each word in that confusion set in the training phase. It also shows the correction accuracy for each window size. There are three rows for each confusion set, in the first we consider all the surrounding words, in the second the function words are ignored, while in the third row the standard deviation approach by Ben Othmane Zribi, C., and M. Ben Ahmed. 2012. "Detection of semantic errors in Arabic texts." Artificial Intelligence 1: 1-16 (incorporated herein by reference) is followed. The results show that the best average accuracy was achieved when k=3, the outcome confirms the results of Golding, A. 1995.

TABLE 14

Baseline method prediction accuracy on the test set for the 28 confusion sets

| Confusion Set | No. of training sentences | Most frequent word (No. of sentences) | No. of test sentences | Baseline Accuracy % |
|---|---|---|---|---|
| كبير – كثير | 6463 | كبير (5080) | 2770 | 78.8 |
| صغير – قصير | 1241 | صغير (671) | 532 | 54.1 |
| أساس – اساس | 2567 | أساس (2469) | 1100 | 96.9 |
| عمارة – إمارة | 1179 | إمارة (988) | 505 | 81.2 |
| ثمن – سمن | 861 | ثمن (839) | 369 | 98.7 |
| العمارة – الإمارة | 283 | الإمارة (472) | 284 | 74.3 |
| ثروة – ثورة | 537 | ثروة (326) | 230 | 57.4 |
| الأرق – الحرق | 348 | الأرق (281) | 149 | 79.2 |
| مصر – مصير | 1310 | مصر (1017) | 562 | 74.9 |
| أشعار – أسعار | 6805 | أسعار (6580) | 2916 | 96.1 |
| القرحة – القرعة | 610 | القرعة (505) | 262 | 77.9 |
| الرحم – الرسم | 1919 | الرحم (1231) | 823 | 62.2 |
| حال – مال | 9785 | مال (7647) | 4193 | 78.8 |
| يفرق – يفرق | 160 | يفرق (123) | 69 | 87.3 |
| غسل – عسل | 654 | غسل (435) | 281 | 70.5 |
| تسير – تسير | 867 | تسير (837) | 351 | 95.4 |
| إسرار – إصرار | 587 | إسرار (397) | 250 | 66.8 |
| الزهور – الظهور | 766 | الظهور (563) | 327 | 75.2 |

TABLE 14-continued

Baseline method prediction accuracy on the test set for the 28 confusion sets

| Confusion Set | No. of training sentences | Most frequent word (No. of sentences) | No. of test sentences | Baseline Accuracy % |
|---|---|---|---|---|
| حاوية – حاوية | 220 | حاوية (204) | 94 | 90.4 |
| سراب – شراب | 152 | شراب (128) | 65 | 83.1 |
| مصير – مصير | 471 | مصير (458) | 202 | 95.6 |
| محنة – مهنة | 734 | مهنة (711) | 315 | 98.1 |
| يسب – يصب | 377 | يصب (373) | 161 | 99.4 |
| ألم – علم | 2388 | علم (1487) | 1023 | 63.7 |
| السعر – الشعر | 4023 | السعر (2627) | 1724 | 65.8 |
| الأرض – العرض | 5206 | العرض (3056) | 2231 | 59.6 |
| الشكر – الشكر | 3472 | الشكر (1766) | 1488 | 50.5 |
| ثلاثة – سلاسة | 1539 | ثلاثة (1471) | 660 | 96.2 |

TABLE 15

Context words method for different values of k using whole words, ignoring stop word and standard deviation used by Bin Othman.

| Confusion Set (w₁-w₂) | # of co-occurences w₁-w₂ | w ± 2 Accuracy % | # of co-occurences w₁-w₂ | w ± 3 Accuracy % | # of co-occurences w₁-w₂ | w ± 5 Accuracy % | # of co-occurences w₁-w₂ | w ± 7 Accuracy % | # of co-occurences w₁-w₂ | w ± 12 Accuracy % | # of co-occurences w₁-w₂ | w ± 20 Accuracy % |
|---|---|---|---|---|---|---|---|---|---|---|---|---|
| كثير-كبير | 12553-4731 | 82.1 | 18091-7422 | 80.7 | 26369-11808 | 78.2 | 32590-15230 | 77.9 | 43603-21413 | 77.3 | 54476-27597 | 77.3 |
| | 12053-4454 | 80.4 | 17489-7038 | 78.9 | 25651-11320 | 78.0 | 31805-14680 | 77.9 | 42708-20757 | 77.8 | 53490-26860 | 77.6 |
| | 12553-4731 | 74.9 | 18091-7422 | 70.2 | 26369-11808 | 69.5 | 32590-15230 | 70.5 | 43603-21413 | 72.7 | 54476-27597 | 70.1 |
| صغير-صغير | 1296-900 | 89.5 | 1951-1466 | 88.7 | 3080-2403 | 84.2 | 4013-3171 | 79.7 | 5819-4745 | 74.4 | 7722-6430 | 73.3 |
| | 1131-758 | 85.7 | 1753-1290 | 84.6 | 2823-2179 | 82.0 | 3704-2921 | 77.6 | 5443-4439 | 73.9 | 7284-6080 | 72.2 |
| | 1296-900 | 89.6 | 1951-1466 | 87.6 | 3080-2403 | 84.9 | 4013-3171 | 81.0 | 5819-4745 | 77.8 | 7722-6430 | 78.3 |
| ثلاث-ثامن | 3073-249 | 96.6 | 4601-373 | 97.6 | 6983-610 | 97.5 | 8864-818 | 97.2 | 12355-1234 | 97 | 1729-16004 | 96.8 |
| | 2834-208 | 97.3 | 4297-310 | 96.6 | 6584-519 | 97.4 | 8443-696 | 96.8 | 11831-1065 | 97 | 15401-1544 | 97 |
| | 3073-249 | 87.7 | 4601-373 | 82.0 | 6983-610 | 71.6 | 8864-818 | 72.1 | 12355-1234 | 71.6 | 1729-16004 | 72.6 |
| إمارة-إشارة | 355-1079 | 95.8 | 562-1804 | 95.1 | 937-2986 | 93.5 | 1279-3987 | 92.9 | 1965-5999 | 92.5 | 2786-8187 | 90.5 |
| | 291-966 | 95.8 | 482-1656 | 95.5 | 820-2790 | 94.1 | 1136-3755 | 93.3 | 1786-5706 | 91.3 | 2565-7836 | 90.1 |
| | 355-1079 | 94.7 | 562-1804 | 93.7 | 937-2986 | 94.3 | 1279-3987 | 91.3 | 1965-5999 | 89.9 | 2786-8187 | 91.3 |
| ثمن-ثمن | 1300-68 | 97.3 | 1932-99 | 98.4 | 2976-159 | 98.9 | 3860-218 | 99.2 | 5616-332 | 98.9 | 7689-470 | 98.9 |
| | 1158-50 | 99.5 | 1753-74 | 98.9 | 2739-124 | 98.7 | 3590-168 | 98.7 | 5285-267 | 98.9 | 7299-387 | 99.2 |
| | 1300-68 | 98.9 | 1932-99 | 99.2 | 2979-159 | 99.5 | 3860-218 | 99.2 | 5616-332 | 98.4 | 7689-470 | 96.5 |
| الإمارة-الإشارة | 371-890 | 87.3 | 599-1319 | 87.3 | 1019-2030 | 92.3 | 1381-2618 | 92.3 | 2090-3770 | 90.5 | 2848-5021 | 89.1 |
| | 321-786 | 91.6 | 539-1200 | 93.3 | 925-1872 | 93.3 | 1268-2431 | 93.3 | 1935-3540 | 91.6 | 2659-4755 | 90.1 |
| | 371-890 | 91.6 | 599-1319 | 90.9 | 1019-2030 | 89.1 | 1381-2618 | 88.0 | 2090-3770 | 87.3 | 2848-5021 | 88 |
| ثروة-غزوة | 708-430 | 78.7 | 1043-656 | 81.3 | 1593-1079 | 83.0 | 1441-2095 | 80.4 | 3134-2246 | 74.8 | 4337-3153 | 80.0 |
| | 600-361 | 77.4 | 903-567 | 82.2 | 1422-950 | 80.7 | 1886-1285 | 75.7 | 2883-2039 | 76.1 | 4035-2911 | 79.1 |
| | 708-430 | 75.7 | 1043-656 | 77.4 | 1593-1079 | 76.1 | 1441-2095 | 71.3 | 3134-2246 | 64.4 | 4337-3153 | 65.2 |
| الحرق-الأرق | 406-162 | 85.9 | 568-247 | 85.9 | 882-378 | 85.9 | 1127-468 | 85.9 | 1593-663 | 86.6 | 2028-866 | 89.3 |
| | 327-132 | 82.6 | 461-208 | 85.2 | 751-321 | 87.9 | 976-400 | 85.2 | 1405-570 | 89.3 | 1716-755 | 91.3 |
| | 406-162 | 85.1 | 568-247 | 83.8 | 882-378 | 84.5 | 1127-468 | 80.4 | 1593-663 | 84.4 | 2028-866 | 89.7 |
| بصر-مصير | 556-1434 | 84.5 | 773-2102 | 87.0 | 1138-3098 | 88.3 | 1464-3939 | 88.3 | 2086-5640 | 89.5 | 2774-7455 | 87.9 |
| | 499-1290 | 86.8 | 700-1925 | 88.3 | 1026-2867 | 89.0 | 1330-3680 | 87.7 | 1914-5320 | 88.8 | 2568-7093 | 87.7 |
| | 556-1434 | 84.7 | 773-2102 | 81.1 | 1138-3098 | 77.2 | 1464-3939 | 76.7 | 2086-5640 | 77.6 | 2774-7455 | 75.3 |
| الشفاء-الشفاء | 415-4339 | 98.3 | 662-6558 | 98.1 | 1072-9733 | 97.8 | 1454-12163 | 97.4 | 2194-16585 | 97.3 | 2991-21052 | 97.0 |
| | 345-4064 | 98.3 | 567-6203 | 97.8 | 943-9306 | 97.6 | 1301-11681 | 97.4 | 1998-16019 | 97.2 | 2757-20426 | 97.1 |
| | 415-4339 | 97.6 | 662-6558 | 95.2 | 1072-9733 | 92.2 | 1454-12163 | 88.9 | 2194-16585 | 86.2 | 2991-21052 | 86.8 |
| الفرحة-الفرحة | 818-214 | 91.6 | 1203-316 | 93.5 | 1804-475 | 93.5 | 2273-615 | 95.0 | 3223-890 | 96.9 | 4253-1174 | 97.3 |
| | 722-166 | 95.8 | 1076-259 | 95.4 | 1634-399 | 96.6 | 2081-522 | 96.9 | 2989-773 | 98.5 | 3980-1024 | 97.7 |
| | 818-214 | 91.9 | 1203-316 | 94.2 | 1804-475 | 94.2 | 2273-615 | 93.1 | 3223-890 | 92.3 | 4253-1174 | 93.1 |
| الرحم-الرسم | 1471-737 | 95.3 | 2132-1147 | 96.4 | 3178-1846 | 97.7 | 4048-2414 | 97.8 | 5618-3534 | 97.9 | 7214-4683 | 97.5 |
| | 1322-643 | 96.1 | 1947-1017 | 97.6 | 2937-1683 | 98.2 | 3772-2215 | 98.5 | 5282-3292 | 97.9 | 6830-4391 | 98.2 |
| | 1471-737 | 93.6 | 2132-1147 | 91.9 | 3178-1846 | 91.4 | 4048-2414 | 96.0 | 5618-3534 | 92.35 | 7214-4683 | 95.0 |
| جبال-جبال | 7204-1625 | 93.8 | 10744-2582 | 92.2 | 15935-4254 | 91 | 19940-5609 | 90.3 | 27378-8094 | 89.8 | 35033-10652 | 89.5 |
| | 6868-1440 | 91.7 | 10313-2355 | 91.2 | 15388-3952 | 90.4 | 19322-5272 | 89.63 | 26635-7688 | 89.4 | 34209-10185 | 89.3 |
| | 7204-1625 | 76.0 | 10744-2582 | 60.0 | 15935-4254 | 47.2 | 19940-5609 | 44.4 | 27378-8094 | 42.4 | 35033-10652 | 42.0 |
| يفرق-يغرق | 111-244 | 92.8 | 157-416 | 89.9 | 250-700 | 81.2 | 327-954 | 79.7 | 524-1466 | 78.3 | 732-2100 | 76.8 |
| | 73-187 | 50.7 | 107-331 | 56.5 | 186-580 | 69.6 | 252-814 | 75.4 | 423-1273 | 75.4 | 609-1872 | 79.7 |
| | 111-244 | 89.9 | 157-416 | 84.1 | 250-700 | 82.6 | 327-954 | 85.5 | 524-1466 | 81.2 | 732-2100 | 79.7 |
| عسل-غسل | 599-406 | 92.5 | 978-607 | 94.0 | 1686-984 | 94 | 2231-1323 | 91.5 | 3291-2004 | 91.5 | 4338-2707 | 91.1 |
| | 515-343 | 93.2 | 874-523 | 95.0 | 1540-867 | 93.2 | 2062-1185 | 92.5 | 3071-1820 | 90.8 | 4083-2481 | 90.75 |
| | 599-406 | 92.9 | 978-607 | 94.7 | 1686-984 | 93.6 | 2231-1323 | 92.9 | 3291-2004 | 94.7 | 4338-2707 | 91.1 |
| تفسير-تشير | 1214-80 | 94.6 | 1887-116 | 96.5 | 3219-185 | 96.5 | 4370-242 | 96.5 | 6475-347 | 96.5 | 8860-443 | 96.5 |
| | 1062-58 | 96.0 | 1665-85 | 96.5 | 2941-143 | 97.0 | 4040-188 | 97.0 | 6080-267 | 97.0 | 8395-343 | 97.3 |
| | 1214-80 | 96.2 | 1887-116 | 97.0 | 3219-185 | 97.0 | 4370-242 | 97.0 | 6475-347 | 96.0 | 8860-443 | 96.2 |
| أسرار-أسرار | 435-684 | 85.6 | 643-1075 | 85.6 | 1051-1780 | 86.4 | 1392-2404 | 81.2 | 2079-3619 | 80.8 | 2918-5009 | 97.2 |
| | 363-579 | 85.6 | 545-945 | 82.8 | 907-1598 | 80.8 | 1223-2186 | 81.2 | 1857-3351 | 80.0 | 2643-4697 | 78.0 |
| | 435-684 | 81.2 | 643-1075 | 68.8 | 1051-1780 | 59.6 | 1392-2404 | 55.6 | 2079-3619 | 58.0 | 2918-5009 | 61.6 |
| الظهور-الزهور | 464-968 | 88.1 | 699-1507 | 89.0 | 1116-2477 | 89.6 | 1442-3255 | 91.4 | 2092-4846 | 91.7 | 2821-6583 | 91.7 |
| | 402-845 | 91.7 | 620-1339 | 90.2 | 1014-2252 | 92.0 | 1314-3003 | 91.4 | 1923-4522 | 94.2 | 2618-6201 | 91.7 |
| | 464-968 | 86.9 | 699-1507 | 84.1 | 1116-2477 | 82.3 | 1442-3255 | 79.8 | 2092-4846 | 78.9 | 2821-6583 | 81.0 |

TABLE 15-continued

Context words method for different values of k using whole words, ignoring stop word and standard deviation used by Bin Othman.

| Confusion Set ($w_1$-$w_2$) | # of co-occurences $w_1$-$w_2$ | w ± 2 Accuracy % | # of co-occurences $w_1$-$w_2$ | w ± 3 Accuracy % | # of co-occurences $w_1$-$w_2$ | w ± 5 Accuracy % | # of co-occurences $w_1$-$w_2$ | w ± 7 Accuracy % | # of co-occurences $w_1$-$w_2$ | w ± 12 Accuracy % | # of co-occurences $w_1$-$w_2$ | w ± 20 Accuracy % |
|---|---|---|---|---|---|---|---|---|---|---|---|---|
| حاوية-هاوية | 50-258 | 93.6 | 75-372 | 93.6 | 124-573 | 93.6 | 171-745 | 92.6 | 275-1125 | 92.6 | 407-1568 | 91.5 |
|  | 41-209 | 90.4 | 61-302 | 91.5 | 99-486 | 93.6 | 137-646 | 96.8 | 22-997 | 94.7 | 336-1423 | 93.6 |
|  | 50-258 | 91.5 | 75-372 | 91.5 | 124-573 | 92.6 | 171-745 | 90.4 | 275-1125 | 90.4 | 407-1568 | 90.4 |
| شراب-سراب | 73-277 | 93.8 | 109-396 | 92.3 | 176-621 | 84.6 | 242-823 | 84.6 | 382-1229 | 86.2 | 561-1675 | 86.2 |
|  | 48-231 | 89.2 | 75-330 | 89.2 | 123-530 | 86.2 | 180-714 | 86.2 | 298-1094 | 87.7 | 450-1507 | 87.7 |
|  | 73-277 | 95.4 | 109-396 | 90.8 | 176-621 | 87.7 | 242-823 | 86.2 | 382-1229 | 84.6 | 561-1675 | 81.5 |
| مهنة-محنة | 45-919 | 95.0 | 67-1351 | 94.1 | 102-2096 | 96.0 | 136-2757 | 96.5 | 212-4048 | 96.0 | 313-5550 | 96.0 |
|  | 36-804 | 95.0 | 51-1195 | 95.5 | 80-1889 | 95.0 | 105-2522 | 95.0 | 167-3756 | 95.5 | 253-5204 | 95.0 |
|  | 45-919 | 96.5 | 67-1351 | 96.0 | 102-2096 | 96.0 | 136-2757 | 96.0 | 212-4048 | 96.0 | 313-5550 | 95.5 |
| مهنة-محنة | 74-1257 | 97.1 | 107-1904 | 98.4 | 174-2971 | 98.1 | 232-3849 | 98.4 | 362-5604 | 98.1 | 519-7587 | 98.1 |
|  | 52-1102 | 99.0 | 79-1710 | 97.8 | 138-2729 | 98.7 | 184-3566 | 98.7 | 299-5259 | 98.4 | 443-7192 | 98.1 |
|  | 74-1257 | 98.4 | 107-1904 | 98.4 | 174-2971 | 98.1 | 232-3849 | 98.1 | 362-5604 | 98.1 | 519-7587 | 98.1 |
| يصب-يصيب | 15-549 | 99.4 | 22-913 | 98.8 | 35-1625 | 99.4 | 44-2249 | 99.4 | 65-3443 | 99.4 | 97-4850 | 99.4 |
|  | 7-460 | 99.4 | 13-796 | 99.4 | 24-1459 | 99.4 | 28-2050 | 99.4 | 42-3194 | 99.4 | 66-4554 | 99.4 |
|  | 15-549 | 99.4 | 22-913 | 99.4 | 35-1625 | 99.4 | 44-2249 | 99.4 | 65-3443 | 99.4 | 97-4850 | 99.4 |
| علم-ألم | 1319-2335 | 84.8 | 1970-3558 | 84.3 | 3071-5554 | 85.2 | 3957-7196 | 84.1 | 5540-10312 | 85.2 | 7197-13700 | 84.4 |
|  | 1155-2096 | 84.9 | 1763-3259 | 83.8 | 2821-5190 | 84.2 | 3661-6777 | 84.0 | 5173-9821 | 85.6 | 6780-13145 | 84.7 |
|  | 1319-2335 | 82.9 | 1970-3558 | 82.1 | 3071-5554 | 77.5 | 3957-7196 | 75.1 | 5540-10312 | 74.7 | 7197-13700 | 76.4 |
| الشعر-السعر | 2798-2023 | 91.8 | 4072-2915 | 94.0 | 5975-4294 | 95.8 | 7522-5398 | 96.3 | 10441-7288 | 96.8 | 13478-9126 | 96.5 |
|  | 2524-1844 | 93.4 | 3749-2694 | 94.4 | 5571-4006 | 96.2 | 7087-566 | 96.6 | 9937-6884 | 97.2 | 12911-8682 | 96.6 |
|  | 2798-2023 | 87.4 | 4072-2915 | 87.8 | 5975-4294 | 88.5 | 7522-5398 | 88.1 | 10441-7288 | 90.1 | 13478-9126 | 91.8 |
| الأرض-العرض | 3301-3592 | 84.8 | 4911-5290 | 85.5 | 7605-7853 | 84.7 | 9739-9912 | 84.9 | 13678-13701 | 83.8 | 17913-17640 | 84.0 |
|  | 3050-3328 | 83.5 | 4602-4990 | 84.1 | 7206-7499 | 83.9 | 9283-9506 | 84.5 | 13141-13220 | 84.1 | 17298-17084 | 84.0 |
|  | 3301-3592 | 81.8 | 4911-5290 | 79.7 | 7605-7853 | 76.9 | 9739-9912 | 78.8 | 13678-13701 | 80.5 | 17913-17640 | 81.6 |
| السكر-الشكر | 1969-1497 | 96.8 | 2970-2406 | 97.8 | 4590-3910 | 98.3 | 5898-5144 | 98.1 | 8149-7629 | 97.6 | 10404-10451 | 97.1 |
|  | 1774-1336 | 96.1 | 2717-2191 | 97.2 | 4273-3631 | 97.8 | 5540-4818 | 97.6 | 7722-7221 | 97.2 | 9923-9983 | 96.8 |
|  | 1969-1497 | 95.6 | 2970-2406 | 93.3 | 4590-3910 | 90.5 | 5898-5144 | 89.0 | 8149-7629 | 89.4 | 10404-10451 | 90.6 |
| سلامة-ثلاثة | 198-1539 | 97.0 | 279-2198 | 97.6 | 447-3492 | 98.3 | 608-4722 | 98.0 | 939-7127 | 97.3 | 1297-9755 | 97.1 |
|  | 163-1410 | 97.4 | 234-2036 | 97.7 | 380-3256 | 97.9 | 530-4453 | 97.7 | 829-6793 | 97.3 | 1167-9336 | 97.0 |
|  | 198-1539 | 97.0 | 279-2198 | 96.8 | 447-3492 | 96.7 | 608-4722 | 96.4 | 939-7127 | 93.6 | 1297-9755 | 90.3 |
| Average with stop words |  | 91.5 |  | 91.5 |  | 91.1 |  | 90.7 |  | 90.3 |  | 90.3 |
| without stop words |  | 91.0 |  | 90.1 |  | 90.8 |  | 90.5 |  | 90.4 |  | 90.1 |
| Bin Othman |  | 86.3 |  | 81.7 |  | 77.6 |  | 73.6 |  | 76.1 |  | 76.2 |

TABLE 16

Comparison between the baseline and word co-occurrence methods with a window size of ±3.

| Confusion Set | Baseline Accuracy % | Word Co-occurrence k = 3 Accuracy % |
|---|---|---|
| كبير – كثير | 78.8 | 80.7 |
| صغير – قصير | 54.1 | 88.7 |
| أساس – أثاث | 96.9 | 97.6 |
| عمارة – إمارة | 81.2 | 95.1 |
| ثمن – سمن | 98.7 | 98.4 |
| العمارة – الإمارة | 74.3 | 87.3 |
| ثروة – ثورة | 57.4 | 81.3 |
| الأرق – الحرق | 79.2 | 85.9 |
| مضر – مصر | 74.9 | 87.0 |
| أشعار – أسعار | 96.1 | 98.1 |
| القرعة – القرحة | 77.9 | 93.5 |
| الرجم – الرسم | 62.2 | 96.4 |
| حال – مال | 78.8 | 92.2 |
| بغرق – بفرق | 87.3 | 89.9 |
|  | 70.5 | 94.0 |
| تسير – تصير | 95.4 | 96.5 |
|  | 66.8 | 85.6 |
| الزهور – الظهور | 75.2 | 89.0 |
|  | 90.4 | 93.6 |
| سراب – شراب | 83.1 | 92.3 |
|  | 95.6 | 94.1 |
| محنة – مهنة | 98.1 | 98.4 |
|  | 99.4 | 98.8 |
| ألم – علم | 63.7 | 84.3 |
|  | 65.8 | 94.0 |
| الأرض – العرض | 59.6 | 85.5 |
|  | 50.5 | 97.8 |
| ثلاثة – سلامة | 96.2 | 97.6 |
| Average | 76.6 | 91.5 |

("A Bayesian Hybrid Method for Context-Sensitive Spelling Correction." Proceedings of the 3rd Workshop on Very Large Corpora, Boston, Mass.: 39-53, incorporated herein by reference) and contradicts with the conclusion of (Ben Othmane Zribi, C., and M. Ben Ahmed. 2012. "Detection of semantic errors in Arabic texts." Artificial Intelligence 1: 1-16, incorporated herein by reference) that the longer the context the better the correction accuracy. The experiments were repeated ignoring the stop (function) words (the results of the second row). The results show that ignoring the function words does not improve the correction rate. This may be due to the nature of Arabic language and the way in which words co-occur with certain function words (i.e. some words are recognized easier if a specific function word precedes or comes after them). The obtained results for k=3 are better than the results obtained in (Ben Othmane Zribi, C., and M. Ben Ahmed. 2012. "Detection of semantic errors in Arabic texts." Artificial Intelligence 1: 1-16, incorporated herein by reference) for all window sizes. Table. 16 compares between the baseline method and the word co-occurrence method for a window of ±3, the table shows that the co-occurrence method on the average of (91.5%) is better than the baseline method (76.6%). Table. 17 shows the confusion matrix of the words in the confusion sets using the word co-occurrence method for the same window size. (Golding, A. 1995. "A Bayesian Hybrid Method for Context-Sensitive Spelling Correction." Proceedings of the 3rd Workshop on Very Large Corpora, Boston, Mass.: 39-53, incorporated herein by reference) pruned context words that have insufficient information, by ignoring context words that occur less than 10 times within the context of the confusion sets. Such words were pruned from the context obtained in the training phase but the accuracy rate dropped, then words that occurred 10 and 5 times were ignored but the accuracy always got worse as the number goes larger i.e. 10 in this case. It is thought that each word in the context is useful in the discrimination process.

Unlike the unsupervised method, the n-gram models in supervised method are built using only the sentences that contain the words from the confusion sets. The seventy percent training sentences for each of the twenty eight confusion sets are used to build the language models.

TABLE 17

Confusion matrix between words in the
confusion sets using context words method for k = 3.

| Confusion set | Word | | | Accuracy % | Total accuracy % |
|---|---|---|---|---|---|
| كبير - كثير | | كبير | كثير | | 80.0 |
| | كبير | 1901 | 272 | 87.5 | |
| | كثير | 282 | 315 | 52.8 | |
| عمارة | | صغير | قصير | | 85.9 |
| | إمارة | 244 | 31 | 88.7 | |
| | قصير | 44 | 213 | 82.9 | |
| أثاث | | أساس | أثاث | | 97.6 |
| | أساس | 1060 | 22 | 98 | |
| | أثاث | 4 | 12 | 75.0 | |
| عمارة - إمارة | | إمارة | عمارة | | 95 |
| | إمارة | 406 | 21 | 95.1 | |
| | عمارة | 4 | 74 | 94.9 | |
| ثمن - سمن | | ثمن | سمن | | 98.4 |
| | ثمن | 361 | 3 | 99.2 | |
| | سمن | 3 | 2 | 40 | |
| ثورة - ثروة | | ثورة | ثروة | | 81.3 |
| | ثورة | 70 | 15 | 82.4 | |
| | ثروة | 28 | 117 | 80.7 | |
| العمارة - الإمارة | | الإمارة | العمارة | | 87.3 |
| | الإمارة | 192 | 17 | 91.9 | |
| | العمارة | 19 | 56 | 74.7 | |
| الأرق - الحرق | | الأرق | الحرق | | 85.9 |
| | الأرق | 113 | 16 | 87.6 | |
| | الحرق | 5 | 15 | 75 | |
| مصر - مضر | | مصر | مضر | | 87 |
| | مصر | 388 | 40 | 90.7 | |
| | مضر | 33 | 101 | 75.4 | |
| أسعار - أشعار | | أسعار | أشعار | | 98.1 |
| | أسعار | 2796 | 50 | 98.2 | |
| | أشعار | 6 | 64 | 91.4 | |

TABLE 17-continued

Confusion matrix between words in the
confusion sets using context words method for k = 3.

| Confusion set | Word | | | Accuracy % | Total accuracy % |
|---|---|---|---|---|---|
| القرعة - القرحة | | القرعة | القرحة | | 93.5 |
| | القرعة | 198 | 11 | 94.7 | |
| | القرحة | 6 | 47 | 88.7 | |
| الرحم - الرسم | | الرحم | الرسم | | 96.4 |
| | الرحم | 501 | 19 | 96.3 | |
| | الرسم | 11 | 292 | 96.4 | |
| حال - مال | | حال | مال | | 92.2 |
| | حال | 3170 | 191 | 94.3 | |
| | مال | 135 | 697 | 83.8 | |
| يفرق - يغرق | | يفرق | يغرق | | 89.9 |
| | يفرق | 11 | 3 | 78.6 | |
| | يغرق | 4 | 51 | 92.7 | |
| غسل - عسل | | غسل | عسل | | 94 |
| | غسل | 189 | 8 | 95.9 | |
| | عسل | 9 | 75 | 89.3 | |
| تسير - تصير | | تسير | تصير | | 96.5 |
| | تسير | 353 | 11 | 97 | |
| | تصير | 2 | 5 | 71.4 | |
| إسرار - إصرار | | إسرار | إصرار | | 85.6 |
| | إسرار | 153 | 22 | 87.4 | |
| | إصرار | 14 | 61 | 81.3 | |
| الزهور - الظهور | | الظهور | الزهور | | 89 |
| | الظهور | 232 | 22 | 91.3 | |
| | الزهور | 14 | 59 | 80.8 | |
| حاوية - هاوية | | حاوية | هاوية | | 93.6 |
| | حاوية | 83 | 4 | 95.4 | |
| | هاوية | 2 | 5 | 71.4 | |
| سراب - شراب | | شراب | سراب | | 92.3 |
| | شراب | 51 | 2 | 96.2 | |
| | سراب | 3 | 9 | 75 | |
| مصير - مسير | | مصير | مسير | | 94.1 |
| | مصير | 188 | 7 | 96.4 | |
| | مسير | 5 | 2 | 28.6 | |
| مهنة - محنة | | مهنة | محنة | | 98.4 |
| | مهنة | 307 | 3 | 99 | |
| | محنة | 2 | 3 | 60 | |
| ينصب - يسب | | ينصب | يسب | | 98.8 |
| | ينصب | 159 | 1 | 99.4 | |
| | يسب | 1 | 0 | 0 | |
| علم - ألم | | علم | ألم | | 84.3 |
| | علم | 570 | 79 | 87.8 | |
| | ألم | 82 | 292 | 78.1 | |
| السعر - الشعر | | السعر | الشعر | | 94 |
| | السعر | 1087 | 57 | 95 | |
| | الشعر | 47 | 533 | 91.9 | |
| الأرض - العرض | | العرض | الأرض | | 85.5 |
| | العرض | 1189 | 184 | 86.6 | |
| | الأرض | 140 | 718 | 83.7 | |
| السكر - الشكر | | السكر | الشكر | | 97.8 |
| | السكر | 729 | 9 | 98.8 | |
| | الشكر | 23 | 727 | 96.9 | |
| ثلاثة - سلاسة | | ثلاثة | سلاسة | | 97.6 |
| | ثلاثة | 633 | 14 | 97.8 | |
| | سلاسة | 2 | 11 | 84.6 | |

Table. 18 shows the statistics of the language models for the N-gram supervised method. The experiments were run on the remaining thirty percent sentences of each of the confusion sets.

TABLE 18

Statistics of language models for
training sentences in the supervised method

| No. of words | Uni-grams | Bi-grams | Tri-grams |
|---|---|---|---|
| 3,131,258 | 138,108 | 1,425,641 | 2,395,324 |

The steps in testing are explained in detail in the N-gram language model description. Table 19 shows the comparison between the baseline and the N-gram methods.

TABLE 19

Comparison between the baseline and the N-gram methods

| Confusion Set | Baseline Accuracy % | N-Gram Accuracy % | No. of test sentences |
|---|---|---|---|
| كبير – كثير | 78.8 | 97.1 | 2770 |
| صغير – قصير | 54.1 | 93.4 | 532 |
| أساس – أناث | 96.9 | 98.6 | 1100 |
| عمارة – إمارة | 81.2 | 97.6 | 505 |
| ثمن – سمن | 98.7 | 99.5 | 369 |
| المعارف – الإمارة | 74.3 | 90.5 | 284 |
| ثروة – ثورة | 57.4 | 80.4 | 230 |
| الأرق – الحرق | 79.2 | 87.1 | 149 |
| مضر – مسر | 74.9 | 92.5 | 562 |
| أشعار – أسعار | 96.1 | 99.3 | 2916 |
| القرعة – الترجمة | 77.9 | 86.8 | 262 |
| الرحم – الرسم | 62.2 | 96.6 | 823 |
| حال – مال | 78.8 | 98.5 | 4193 |
| يغرق – يفرق | 87.3 | 87.0 | 69 |
| غسل – عسل | 70.5 | 94.7 | 281 |
| تسير – تصير | 95.4 | 95.7 | 351 |
| إسرار – إصرار | 66.8 | 85.2 | 250 |
| الزهور – الظهور | 75.2 | 89.0 | 327 |
| هاوية – حلوية | 90.4 | 94.7 | 94 |
| سراب – شراب | 83.1 | 89.2 | 65 |
| مسير – مصير | 95.6 | 97.0 | 202 |
| محنة – مهنة | 98.1 | 98.7 | 315 |
| يسبب – يصبب | 99.4 | 99.4 | 161 |
| ألم – علم | 63.7 | 92.1 | 1023 |
| السمر – الشعر | 65.8 | 92.3 | 1724 |
| الأرض – العرض | 59.6 | 92.3 | 2231 |
| السكر – الشكر | 50.5 | 97.6 | 1488 |
| ثلاثة – سلاسة | 96.2 | 99.6 | 660 |
| Average | 76.6 | 95.9 | |

The results show that the n-gram language models scores an average of 95.9% accuracy compared with an average accuracy of 76.6% for the baseline method. Other experiments using separate language models were run built for each confusion set training sentences; it refers to it as Separate LMs. The same procedure is applied to the test sentences as only the language models for that confusion set is used. The average accuracy obtained from the Separate LMs is 94.7%. Table. 20 shows the results for the Separate LMs and compares them with the results obtained by the other techniques. This indicates that there is no advantage of using separate language models.

TABLE 20

Comparison between the baseline, the separate LMs and the N-gram methods.

| Confusion Set | Baseline Accuracy % | N-Gram Accuracy % | Separate LMs Accuracy % | No. of test sentences |
|---|---|---|---|---|
| كبير – كثير | 78.8 | 97.1 | 95.3 | 2770 |
| صغير – قصير | 54.1 | 93.4 | 92.8 | 532 |
| أساس – أناث | 96.9 | 98.6 | 98.9 | 1100 |
| عمارة – إمارة | 81.2 | 97.6 | 96.4 | 505 |
| ثمن – سمن | 98.7 | 99.5 | 99.5 | 369 |
| المعارف – الإمارة | 74.3 | 90.5 | 91.6 | 284 |
| ثروة – ثورة | 57.4 | 80.4 | 83.5 | 230 |
| الأرق – الحرق | 79.2 | 87.1 | 88.4 | 149 |
| مضر – مسر | 74.9 | 92.5 | 91.1 | 562 |
| أشعار – أسعار | 96.1 | 99.3 | 99.3 | 2916 |
| القرعة – الترجمة | 77.9 | 86.8 | 92.6 | 262 |
| الرحم – الرسم | 62.2 | 96.6 | 94.9 | 823 |
| حال – مال | 78.8 | 98.5 | 98.6 | 4193 |
| يغرق – يفرق | 87.3 | 87.0 | 84.1 | 69 |
| غسل – عسل | 70.5 | 94.7 | 93.6 | 281 |
| تسير – تصير | 95.4 | 95.7 | 96.2 | 351 |
| إسرار – إصرار | 66.8 | 85.2 | 88.8 | 250 |
| الزهور – الظهور | 75.2 | 89.0 | 91.1 | 327 |
| هاوية – حلوية | 90.4 | 94.7 | 90.4 | 94 |
| سراب – شراب | 83.1 | 89.2 | 84.6 | 65 |
| مسير – مصير | 95.6 | 97.0 | 96.5 | 202 |
| محنة – مهنة | 98.1 | 98.7 | 53.0 | 315 |
| يسبب – يصبب | 99.4 | 99.4 | 99.4 | 161 |
| ألم – علم | 63.7 | 92.1 | 91.7 | 1023 |
| السمر – الشعر | 65.8 | 92.3 | 91.3 | 1724 |
| الأرض – العرض | 59.6 | 92.3 | 89.7 | 2231 |
| السكر – الشكر | 50.5 | 97.6 | 97.0 | 1488 |
| ثلاثة – سلاسة | 96.2 | 99.6 | 97.3 | 660 |
| Average | 76.6 | 95.9 | 94.7 | |

Word co-occurrence method and the N-gram language models method were combined in the conducted experiments. The combination method checks the decisions made by the two methods, if they agree on a decision, either correct or incorrect, this decision is considered as the decision of the combined method. If the two methods do not agree on a decision, the method uses the difference of the probabilities for each method to decide which decision to choose, the one with the highest difference probability will be considered as the taken decision. The difference probability for each method is shown in Equation 10.

$$\text{Difference} = \frac{\text{Probability}_{word1} - \text{Probability}_{word2}}{\text{Probability}_{word1}} \quad (E.10)$$

where: $\text{Probability}_{word1} \geq \text{Probability}_{word2}$

The results of the combining methods with comparison the other methods results are shown in Table. 21. In some confusion sets, the combined method scored a better accuracy rate than the other method. However, with average accuracy rate of 95.9%, the N-gram language method scored the best results among all methods presented. The error rate in the combination method was reduced by rejecting the unmatched decisions made by the two techniques. In other words, if the two methods agree on a decision, this decision is considered as the decision of the combined method, otherwise the decision is rejected. Previously the error rate was 4.6% without using the rejection scheme. Although the accuracy rate reduced, however, after applying the rejection scheme the error rate dropped to 1.8%, 61% of the combined method errors has been reduced using the combination with rejection. Table. 22 shows the reduction of error rate using the rejection scheme.

TABLE 21

Comparing the baseline, context-words, N-gram, and combined methods.

| Confusion Set | Baseline Accuracy % | Word Co-occurrence Accuracy % | N-Gram Accuracy % | Combined Accuracy % |
|---|---|---|---|---|
| كبار ـ كبير | 78.8 | 80.7 | 97.1 | 92.2 |
| صغير ـ قصير | 54.1 | 88.7 | 92.5 | 91.3 |
| أساس ـ أثاث | 96.9 | 97.6 | 98.6 | 98.5 |
| عمارة ـ إمارة | 81.2 | 95.1 | 96.8 | 97.3 |
| ثمن ـ سمن | 98.7 | 98.4 | 99.5 | 99.7 |
| المعارف ـ الإمارة | 74.3 | 87.3 | 90.5 | 91.6 |
| ثروة ـ ثورة | 57.4 | 81.3 | 70.4 | 87.0 |
| الأرق ـ الحرق | 79.2 | 85.9 | 77.6 | 87.1 |
| مضر ـ مصر | 74.9 | 87.0 | 82.0 | 92.2 |
| أشعار ـ أسعار | 96.1 | 98.1 | 99.3 | 99.1 |
| القرعة ـ القرحة | 77.9 | 93.5 | 86.8 | 94.2 |
| الرحم ـ الرسم | 62.2 | 96.4 | 89.2 | 97.8 |
| حال ـ مال | 78.8 | 92.2 | 97.0 | 97.1 |
| يغرق ـ يفرق | 87.3 | 89.9 | 81.2 | 84.1 |
| غسل ـ عسل | 70.5 | 94.0 | 84.3 | 95.7 |
| تبير ـ تصير | 95.4 | 96.5 | 95.7 | 96.2 |
| إسرار ـ إصرار | 66.8 | 85.6 | 85.2 | 86.0 |
| الزهور ـ الظهور | 75.2 | 89.0 | 87.8 | 89.0 |
| هاوية ـ حاوية | 90.4 | 93.6 | 91.5 | 94.7 |
| سرابٍ ـ شراب | 83.1 | 92.3 | 89.2 | 89.3 |
| مسير ـ مصير | 95.6 | 94.1 | 96.5 | 97.0 |
| محنة ـ مهنة | 98.1 | 98.4 | 98.7 | 99.1 |
| يسب ـ يصيب | 99.4 | 98.8 | 99.4 | 99.4 |
| آلم ـ علم | 63.7 | 84.3 | 90.2 | 91.5 |
| السعر ـ الشعر | 65.8 | 94.0 | 90.8 | 95.2 |
| الأرض ـ العرض | 59.6 | 85.5 | 88.8 | 92.3 |
| السكر ـ الشكر | 50.5 | 97.8 | 97.6 | 98.5 |
| ثلاثة ـ سلامة | 96.2 | 97.6 | 99.6 | 97.4 |
| Average | 76.6 | 91.5 | 95.9 | 95.4 |

TABLE 22

Reducing error rate in the combination method using rejection.

| | Without rejection | | Using rejection | | |
|---|---|---|---|---|---|
| Confusion Set | Accuracy % | Error rate % | Accuracy % | Error rate % | Rejection % |
| كبير ـ كبار | 92.2 | 7.8 | 78.0 | 2.0 | 20 |
| صغير ـ قصير | 91.3 | 8.7 | 83.1 | 3.8 | 13.2 |
| أساس ـ أثاث | 98.5 | 1.5 | 97.2 | 0.9 | 1.9 |
| عمارة ـ إمارة | 97.3 | 2.7 | 93.7 | 1.0 | 5.3 |
| ثمن ـ سمن | 99.7 | 0.3 | 98.1 | 0.3 | 1.6 |
| المعارف ـ الإمارة | 91.6 | 8.4 | 56.0 | 3.2 | 40.8 |
| ثروة ـ ثورة | 87.0 | 13.0 | 71.3 | 9.1 | 19.6 |
| الأرق ـ الحرق | 87.1 | 12.9 | 82.3 | 8.8 | 8.8 |
| مضر ـ مصر | 92.2 | 7.8 | 83.3 | 3.6 | 13.2 |
| أشعار ـ أسعار | 99.1 | 0.9 | 97.8 | 0.5 | 1.8 |
| القرعة ـ القرحة | 94.2 | 5.8 | 89.5 | 2.0 | 8.6 |
| الرحم ـ الرسم | 97.8 | 2.2 | 94.4 | 1.5 | 4.1 |
| حال ـ مال | 97.1 | 2.9 | 91.7 | 1.0 | 7.3 |
| يغرق ـ يفرق | 84.1 | 15.9 | 81.2 | 4.3 | 14.5 |
| غسل ـ عسل | 95.7 | 4.3 | 89.7 | 1.0 | 9.3 |
| تبير ـ تصير | 96.2 | 3.8 | 95.2 | 3.0 | 1.9 |
| إسرار ـ إصرار | 86.0 | 14.0 | 56.0 | 6.0 | 38.0 |
| الزهور ـ الظهور | 89.0 | 11.0 | 82.6 | 4.6 | 12.8 |
| هاوية ـ حاوية | 94.7 | 5.3 | 92.6 | 4.3 | 3.2 |
| سراب ـ شراب | 89.3 | 10.7 | 80.0 | 1.5 | 18.5 |
| مسير ـ مصير | 97.0 | 3.0 | 94.0 | 3.0 | 3.0 |
| محنة ـ مهنة | 99.1 | 0.9 | 97.8 | 0.6 | 1.6 |
| يسب ـ يصيب | 99.4 | 0.6 | 99.0 | 0.5 | 0.5 |
| آلم ـ علم | 91.5 | 8.5 | 79.7 | 3.3 | 17.0 |
| السعر ـ الشعر | 95.2 | 4.8 | 88.6 | 2.3 | 9.1 |
| الأرض ـ العرض | 92.3 | 7.7 | 80.9 | 3.1 | 16.0 |
| السكر ـ الشكر | 98.5 | 1.5 | 95.2 | 0.4 | 4.4 |
| ثلاثة ـ سلامة | 97.4 | 2.6 | 70 | 0.5 | 29.5 |
| Average | 95.4 | 4.6 | 87.8 | 1.8 | 10.4 |

FIG. 11 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

"Real-Word Error Detection and Correction in Arabic Text," Majed Mohammed Abdulqader Al-Jefri, Master's Thesis in Information Science and Computer Science, King Fand University of Petroleum and Minerals, Dharan, Saudi Arabia, May 2013 is incorporated herein by reference in its entirety.

The invention claimed is:

1. An Arabic language spelling error detection and correction method, comprising:
   comparing digitized text with a corpus database of Arabic words and sentences to identify text errors and grammatical errors in the digitized text;
   identifying a plurality of candidate correction options from a dictionary of text for at least one of the text errors and the grammatical errors identified in the comparing, wherein the candidate correction options are detected with a plurality of n-gram statistic model sequences,
   ranking the candidate correction options in order of highest probability of most correct alternative using the n-gram statistical model sequences,
   selecting a highest probability correction word according to the context of the text,
   conducting a final end of file evaluation by comparing the highest probability correction word with the corresponding text error or grammatical error to assess the accuracy of the highest probability correction word; and initiating a word correction by substituting the text error or the grammatical error with the highest probability correction word when the accuracy of the selected word is positive.

2. The Arabic language spelling error detection and correction method in claim 1, comprising:

during the comparing, extracting words from the corpus database of Arabic words, counting the extracted words and arranging the extracted words in order of occurrence.

3. The Arabic language spelling error detection and correction method in claim 1, comprising:

forming a plurality of word dictionaries and arranging the word dictionaries in descending order based on the number of times each word occurs.

4. The Arabic language spelling error detection and correction method in claim 1, comprising:

generating a plurality of n-gram language models comprising of uni-grams, bi-grams and tri-grams.

5. The Arabic language spelling error detection and correction method in claim 1, comprising:

forming a plurality of supervised learning models incorporating one or more confusion sets, and detecting real-word Arabic spelling errors with the supervised learning models.

6. The Arabic language spelling error detection and correction method in claim 5, wherein the confusion sets are generated by collecting two types of words:

words that are recognized as correctly spelled words by an Arabic optical character recognition (OCR) system but are not the same words in the original text; and words that have similar pronunciations.

7. The Arabic language spelling error detection and correction method in claim 6, wherein the similar pronunciation words are collected by collecting and classifying words into groups according to frequent words confused by non-native Arabic speakers.

8. The Arabic language spelling error detection and correction method in claim 1, comprising:

storing a database of commonly misspelled words and arranging the commonly misspelled words in groups according to at least one of the similarity of the sounds of the letters of the words and closeness of meaning of the words.

9. The Arabic language spelling error detection and correction method in claim 1, further comprising:

comparing a database of closely spelled words with similar sounding letters that have alternative meanings with the n-gram model to detect spelling errors.

10. The Arabic language spelling error detection and correction method in claim 1, wherein the comparing further comprises utilizing context-sensitive comparing techniques that employ syntactic and semantic knowledge of the Arabic language.

11. The Arabic language spelling error detection and correction method in claim 10, wherein identifying text errors further comprising:

for each tri-gram in a sentence under consideration if the tri-gram $\{w_{i-2}, w_{i-1}, w_i\}$ is not found, then the comparing matching is attempted using bi-grams, such that:

if both bi-grams $\{w_{i-1}, w_i\}, \{w_i, w_{i+1}\}$ are not found, then the word $w_i$ is flagged and categorized as a suspicious word $W_s$, wherein a suspicious word is any word suspected of being out of context or containing grammatical, contextual, syntactic or semantic errors.

12. The Arabic language spelling error detection and correction method in claim 11, wherein for each suspicious word $W_s$ the method further comprising:

finding all of the $W_s$'s spelling variations, such that:

for each variation $W_v$ the method further comprises:

replacing $W_s$ with $W_v$ calculating the new sentence probability; and flagging the original word as an error if the formed sentence probability is greater than the original sentence probability.

13. The Arabic language spelling error detection and correction method of claim 1, the comparing matching further comprising:

receiving text with detected errors;

for each detected error word $W_e$ the method further comprising:

finding all spelling variations $W_v$ of detected error word $W_e$, such that for each spelling variation $W_v$, the method further comprises:

replacing the detected error word $W_e$ with spelling variation $W_v$; and calculating a new sentence probability for each sentence and associated spelling variation $W_v$ within each sentence.

14. The Arabic language spelling error detection and correction method of claim 1, further comprising:

saving the sentence and spelling variation $W_v$ with a maximum sentence probability;

flagging the sentence and associated spelling variation $W_v$ with the maximum sentence probability as the correct alternative to the erroneous word if the maximum sentence probability of the sentence and associated spelling variation $W_v$ is greater than the sentence probability of the sentence and error word $W_e$; and outputting the correct alternative.

15. An apparatus for detecting and correcting spelling errors, the apparatus comprising:

circuitry configured to generate a word co-occurrence model for a given set of words to be analyzed;

to generate an n-gram language model for the given set of words; and to check an output made by the word co-occurrence model and an output made by the n-gram language model and to compare the two outputs of two models, wherein if the two outputs of the two models are determined to be the same, then this output is considered the output of the combined method of the word co-occurrence model and the n-gram language model and a correct word is output.

16. The apparatus of claim 15, wherein to generate a word co-occurrence model, the circuitry is further configured to:

tag at least one confusion set that is most probable to a context of the given set of words;

identify at least one word from a confusion set that is semantically unrelated to the word's context; and identify which variation of the at least one word is related to the context of the given set of words.

17. The apparatus of claim 16, wherein to generate a word co-occurrence model, the circuitry is further configured to:

identify a $\pm k$ words window in a training corpus;

estimate the probabilities of context words surrounding the at least one word using a maximum likelihood estimate (MLE); and select at least one word associated with the context words with the highest estimated probability.

18. The apparatus of claim 15, wherein if the two models are not in agreement, the model with a highest difference in probability is selected, wherein the difference in probability is calculated as:

$$\text{Difference} = \frac{\text{Probability}_{word1} - \text{Probability}_{word2}}{\text{Probability}_{word1}}$$

where: $\text{Probability}_{word1} \geq \text{Probability}_{word2}$.

* * * * *